United States Patent
Liu et al.

(10) Patent No.: US 12,495,129 B2
(45) Date of Patent: Dec. 9, 2025

(54) METHODS AND SYSTEMS FOR PERSONALIZED IMAGE GENERATION

(71) Applicant: ZHEJIANG LINGDI DIGITAL TECHNOLOGY CO., LTD., Zhejiang (CN)

(72) Inventors: Chen Liu, Hangzhou (CN); Huang Chen, Hangzhou (CN); Gaofeng He, Hangzhou (CN); Huamin Wang, Hangzhou (CN)

(73) Assignee: ZHEJIANG LINGDI DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/227,454

(22) Filed: Jun. 3, 2025

(65) Prior Publication Data
US 2025/0294125 A1 Sep. 18, 2025

Related U.S. Application Data

(63) Continuation of application No. 18/976,318, filed on Dec. 10, 2024, now Pat. No. 12,355,932, which is a
(Continued)

(30) Foreign Application Priority Data

Jul. 10, 2023 (CN) .......................... 202310841791.X
Oct. 23, 2023 (CN) .......................... 202311378004.9
(Continued)

(51) Int. Cl.
*H04N 13/111* (2018.01)
*G06F 40/284* (2020.01)
(Continued)

(52) U.S. Cl.
CPC ......... *H04N 13/111* (2018.05); *G06F 40/284* (2020.01); *G06F 40/40* (2020.01);
(Continued)

(58) Field of Classification Search
CPC .. H04N 13/111; H04N 13/398; G06F 40/284; G06F 40/40; G06T 2207/20221;
(Continued)

(56) References Cited

U.S. PATENT DOCUMENTS

2007/0198118 A1* 8/2007 Lind ...................... A41H 3/007
 700/138
2013/0215116 A1 8/2013 Siddique et al.
(Continued)

FOREIGN PATENT DOCUMENTS

CN 105404392 A 3/2016

OTHER PUBLICATIONS

Zanfir et al., "Human Synthesis and Scene Compositing", arXiv. 1909.10307v2[cs.CV] Oct. 18, 2019 https://doi.org/10.48550/arXiv.1909.10307. (Year: 2019).*
(Continued)

*Primary Examiner* — Sing-Wai Wu
(74) *Attorney, Agent, or Firm* — METIS IP LLC

(57) ABSTRACT

A method and a system for personalized image generation are provided. The method includes: determining a facial description text specified by a user; generating, based on the facial description text, a facial image by using a generative algorithm; obtaining a first dressing effect image of a target garment, the first dressing effect image presenting a wearing effect of the target garment on a digital model; and generating a second dressing effect image of the target garment by performing a fusion operation on the facial image and the first dressing effect image, the second dressing effect image presenting a wearing effect of the target garment on a fused
(Continued)

digital model. The provided solution not only enables the rapid, high-quality generation of garment images but also ensures that the fused images maintain feature consistency, meeting users' personalized display preferences.

19 Claims, 23 Drawing Sheets

Related U.S. Application Data continuation-in-part of application No. PCT/CN2024/118044, filed on Sep. 10, 2024.

(30) Foreign Application Priority Data

Jun. 18, 2024 (CN) .................. 202410787264.X
Jul. 9, 2024 (CN) .................. 202410915615.0

(51) Int. Cl.
*G06F 40/40* (2020.01)
*G06T 7/11* (2017.01)
*G06T 7/174* (2017.01)
*G06V 10/77* (2022.01)
*G06V 20/20* (2022.01)
*G06V 20/64* (2022.01)
*G06V 40/16* (2022.01)
*H04N 13/398* (2018.01)

(52) U.S. Cl.
CPC ............... *G06T 7/11* (2017.01); *G06T 7/174* (2017.01); *G06V 10/7715* (2022.01); *G06V 20/20* (2022.01); *G06V 20/64* (2022.01); *G06V 40/171* (2022.01); *H04N 13/398* (2018.05); *G06T 2207/20221* (2013.01)

(58) Field of Classification Search
CPC ....... G06T 7/11; G06T 7/174; G06V 10/7715; G06V 20/20; G06V 20/64; G06V 40/171
See application file for complete search history.

(56) References Cited

U.S. PATENT DOCUMENTS

| | | |
|---|---|---|
| 2019/0332900 A1 | 10/2019 | Sjolund et al. |
| 2021/0019541 A1 | 1/2021 | Wang et al. |
| 2021/0027511 A1 | 1/2021 | Shang et al. |
| 2021/0224886 A1* | 7/2021 | Fu .................. G06Q 30/0623 |
| 2022/0084270 A1 | 3/2022 | Zhang et al. |
| 2023/0017112 A1 | 1/2023 | Song et al. |
| 2023/0334527 A1 | 10/2023 | Sukhwani |

OTHER PUBLICATIONS

Wang_CN104820930_EngXlate_EPO (Year: 2015).*
Muhammad Zeeshan Khan et al., A Realistic Image Generation of Face From Text Description Using the Fully Trained Generative Adversarial Networks, IEEE Access, 9: 1250-1260, 2021.
"AI is now used to make clothing. "Style3D" uses domestic industrial software technology to create clothing AI applications | Early projects", Web page <https://www.36kr.com/p/2333312205374983>, Jul. 7, 2023.

* cited by examiner

METHODS AND SYSTEMS FOR PERSONALIZED IMAGE GENERATION

CROSS-REFERENCE TO RELATED APPLICATIONS

This application is a Continuation of U.S. patent application Ser. No. 18/976,318 filed on Dec. 10, 2024, which is a Continuation-in-part of International Application No. PCT/CN2024/118044, filed on Sep. 10, 2024, which claims priority to Chinese Patent Application No. 202410915615.0, filed on Jul. 9, 2024, Chinese Patent Application No. 202410787264.X, filed on Jun. 18, 2024, Chinese Patent Application No. 202311378004.9, filed on Oct. 23, 2023, and Chinese Patent Application No. 202310841791.X, filed on Jul. 10, 2023, the entire contents of each of which are incorporated herein by reference.

TECHNICAL FIELD

The present disclosure relates to the field of terminal technology, and in particular, to methods and systems for personalized image generation.

BACKGROUND

With the popularity of online shopping and the increasing demand for personalized consumer experiences, people have higher expectations for personalized garment customization. Traditional methods of garment customization mainly rely on flat design and fitting, which cannot intuitively showcase how the garment will look on a model, making it difficult to visually display the actual effect of the garment on different body types.

At the same time, in the field of garment customization and design, providing customers with personalized garment effect displays is of great significance. Users often hope to adjust garment styles, colors, and accessories according to their own needs and preferences, and preview the finished product effect through various model attributes.

Existing technologies have developed some methods for custom garment rendering, such as hand-drawing, image editing software, or virtual reality technology. However, these methods still have limitations and shortcomings, such as a lack of realism and accuracy. In addition, custom rendering requires significant human resources and time. Using image editing software requires users to have some image processing skills, and virtual reality technology demands expensive equipment and specialized knowledge, making it relatively complex for ordinary users to operate.

SUMMARY

In view of the foregoing, one or more embodiments of the present disclosure provide technical solutions as follows:

In a first aspect of one or more embodiments of the present disclosure, a method for personalized image generation is provided. The method may include: determining a facial description text specified by a user; generating, based on the facial description text, a facial image by using a generative algorithm; obtaining a first dressing effect image of a target garment, the first dressing effect image presenting a wearing effect of the target garment on a digital model; and generating a second dressing effect image of the target garment by performing a fusion operation on the facial image and the first dressing effect image, wherein the second dressing effect image presents a wearing effect of the target garment on a fused digital model.

In a second aspect of one or more embodiments of the present disclosure, a system for personalized image generation is provided. The system may include a facial image generation module, a dressing effect image acquisition module, and an image fusion module. The facial image generation module may be configured to determine a facial description text specified by a user and generate, based on the facial description text, a facial image by using a generative algorithm. The dressing effect image acquisition module may be configured to obtain a first dressing effect image of a target garment, the first dressing effect image presenting a wearing effect of the target garment on a digital model; and the image fusion module may be configured to generate a second dressing effect image of the target garment by performing a fusion operation on the facial image. The first dressing effect image, the second dressing effect image presenting a wearing effect of the target garment on a fused digital model.

In a third aspect of one or more embodiments of the present disclosure, a method for personalized image generation is provided. The method may include: generating a 3D model by performing 3D modeling on a garment and a model; obtaining a rendered image by rendering the 3D model; parsing a garment element and a model element of the rendered image; and obtaining a finished image by modifying the rendered image, wherein the modifying the rendered image includes at least one of adjusting the garment element, adjusting the model element, or adding a new element.

In a fourth aspect of one or more embodiments of the present disclosure, a system for personalized image generation is provided. The system may include: a modeling module configured to generate a 3D model by performing 3D modeling on a garment and a model; a rendering module configured to obtain a rendered image by rendering the 3D model; a parsing module configured to parse a garment element and a model element of the rendered image; and a modification module configured to obtain a finished image, wherein the modifying the rendered image includes at least one of adjusting the garment element, adjusting the model element, or adding a new element.

In a fifth aspect of one or more embodiments of the present disclosure, a method for personalized image generation is provided. The method may include: obtaining a rendered image, the rendered image at least including a model element and a garment element; parsing the garment element and the model element of the rendered image; and receiving an adjustment instruction for the garment element and/or the model element, so as to modify the rendered image to obtain a finished image.

In a sixth aspect of one or more embodiments of the present disclosure, a system for personalized image generation is provided. The system may include: an acquisition module configured to obtain a rendered image, the rendered image at least including a model element and a garment element; a parsing module configured to parse the garment element and the model element of the rendered image; and a modification module configured to receive an adjustment instruction for the garment element and/or the model element, so as to modify the rendered image to obtain a finished image.

In a seventh aspect of one or more embodiments of the present disclosure, a method for customizing a model face based on facial consistency preservation is provided. The method may include: obtaining a source model face; extracting facial data and/or hair data of the source model face;

directly obtaining a reference model face, or obtaining the reference model face by performing a parametric description on at least one of a basic feature, a five-sense-organ feature, or a hair feature using a preset face parametric customization module; extracting a first feature vector from the facial data and/or the hair data of the source model face, and extracting a second feature vector by performing face recognition on the reference model face; obtaining a fusion result by performing feature fusion on the first feature vector and the second feature vector; and obtaining a target model face by decoding the fusion result.

In an eighth aspect of one or more embodiments of the present disclosure, a system for customizing a model face based on facial consistency preservation is provided. The system may include: a first acquisition unit configured to obtain a source model face and extract facial data and/or hair data of the source model face; a second acquisition unit configured to directly obtain a reference model face, or obtain the reference model face by performing a parametric description on at least one of a basic feature, a five-sense-organ feature, or a hair feature using a preset face parametric customization module; a feature vector unit configured to extract a first feature vector from the facial data and/or the hair data of the source model face, and extract a second feature vector by performing face recognition on the reference model face; a feature fusion unit configured to perform feature fusion on the first feature vector and the second feature vector to obtain a fusion result; and a generation unit configured to obtain a target model face by decoding the fusion result, and optimize and enhance recognizability and expressiveness of the target model face through a face beautification module.

In a ninth aspect of one or more embodiments of the present disclosure, an electronic device is provided. The electronic device may include a processor and a storage device configured to store processor-executable instructions. The processor may be configured to implement operations of the method of any one of the first, the third, the fifth, and the seventh aspects by running the processor-executable instructions.

In a tenth aspect of one or more embodiments of the present disclosure, a computer-readable storage medium is provided. The storage medium stores computer instructions, wherein when executing the computer instructions, a processor implements operations of the method of any one of the first, the third, the fifth, and the seventh aspects.

In an eleventh aspect of one or more embodiments of the present disclosure, a computer program product comprising a computer program or instruction is provided, wherein when executing the computer program or instruction, a processor implements operations of the method of any one of the first, the third, the fifth, and the seventh aspects.

The embodiments of the present disclosure may achieve the following technical effects:

Using the method for personalized image generation described in the first aspect, high-quality quick generation of garment images can be achieved, enhancing the efficiency of image production, content distribution, and satisfying marketing demands. The method maintains high fidelity of modeled garment with low operational difficulty, significantly reducing time and labor costs while offering a broad range of applications. Additionally, the user can specify facial description text based on their needs to invoke generative algorithms to produce facial images that meet those needs. Compared to user-drawn or 3D model-captured facial images, this method generates images with greater realism (i.e., less CG feel), which makes the second dressing effect image obtained from the fusion process have strong realism. Moreover, by merging the facial image with the first dressing effect image, which shows the wearing effect of the target garment on the digital model, the second dressing effect image that presents the wearing effect of the target garment on the fused digital model can be produced. The second dressing effect image maintains feature of the facial image and the digital model in the first dressing effect image, such that the appearance of the fused digital model in the second dressing effect image can present both the facial features in the facial image and the inherent body features of the digital model. The display effect of the second dressing effect image also meets the demands of the user. Clearly, compared to related techniques that involve direct cropping, stitching, or replacing faces, this method provides a more realistic and natural body display effect in the second dressing effect image through the fusion process.

Using the method for personalized image generation described in the third aspect, high-quality quick generation of garment images is achieved, thereby enhancing the efficiency of image production, content distribution, and marketing demands. The method maintains high fidelity of modeled garment with low operational difficulty, significantly reducing time and labor costs while offering a broad range of applications.

Utilizing the method for customizing a model face based on facial consistency preservation described in the fifth aspect, a target model face can be quickly output based on a source model face and a reference model face, effectively maintaining feature consistency between the source and reference model faces. The method preserves the personalized features on the model face, achieving high-quality facial images with high resolution and detailed richness, allowing for precise modification and customization of facial features. The face parametric customization module can meet the highly personalized customization of the reference model face, further enabling applications in more demand scenarios.

DETAILED DESCRIPTION

In order to solve the above problems in the related technology, the present disclosure proposes a method for personalized image generation, which allows a user to flexibly adjust elements in an image in order to make modifications to a rendered image. Additionally, the present disclosure proposes a method for customizing a model face based on facial consistency preservation, wherein a first feature vector of a source model face and a second feature vector of a reference model face are extracted, and then feature fusion is performed on the two feature vectors to obtain a target model face. The present disclosure also proposes another method for personalized image generation based on image fusion, wherein a facial image is uploaded by a user or generated based on face description information specified by the user, and then the facial image and a first dressing effect image are fused to obtain a second dressing effect image. The three methods and their respective corresponding systems are described in detail below in connection with the accompanying drawings and related embodiments.

The method and system for personalized image generation proposed herein are described below in connection with Embodiment 1, Embodiment 2, and Embodiment 3.

Embodiment 1

Figure 1:
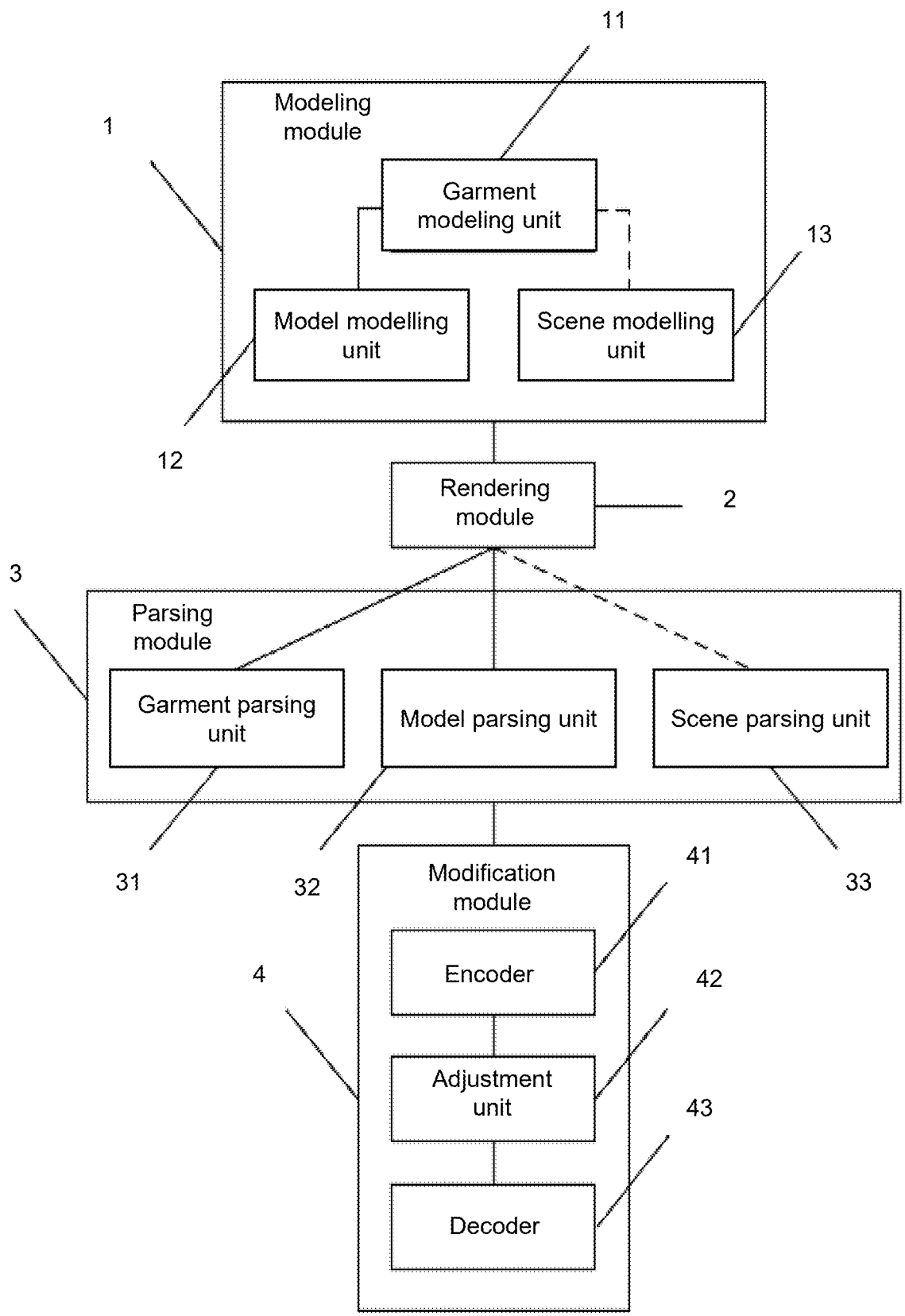
FIG. 1 is a block diagram of an exemplary system for personalized image generation provided in Embodiment 1.

The present embodiment proposes a system for personalized image generation, which can quickly generate high-quality 3D garment models. It allows for efficient single and multiple image generation of any scene, model, pose, and perspective, improving content distribution efficiency and meeting marketing needs, while maintaining high fidelity in the garment modeling. Referring to FIG. 1, the system comprises a modeling module 1, a rendering module 2, a parsing module 3, and a modification module 4.

The modeling module 1 is configured to generate a 3D model by performing 3D modeling on a garment and a model.

The rendering module 2 is configured to obtain a rendered image by rendering the 3D model.

The parsing module 3 is configured to parse a garment element and a model element of the rendered image; and The modification module 4 is configured to modify the rendered image to obtain a finished image, wherein the modifying the rendered image includes at least one of adjusting the garment element, adjusting the model element, or adding a new element.

In the present embodiment, the rendering module 2 is configured to render the garment in the 3D model to make the garment more lifelike. The garment element parsed by the parsing module 3 and adjusted by the modifying module 4 may include an outline, a texture, a color, and/or a style of the garment. The model element may include a skin color, an expression, a posture, a facial contour, a hair style, a body shape, and/or a makeup, etc., of the model.

In some embodiments, the modification module 4 may also be configured to obtain prior information parsed by the parsing module 3 from the garment, the model, etc., and uses the prior information as the prior knowledge for the controllable and stable generation of a generative AI, which effectively ensures the robustness of the system operation.

It should be noted that the image obtained by the system for personalized image generation proposed in this embodiment may be a single image or a set of multiple images, making full use of digital modeling capabilities without the need for complex model modeling. Additionally, it eliminates the need for traditional processes such as sample garment creation, model shooting, and retouching, enabling fast image rendering and content distribution.

For example, when a user needs to get a set of multiple images, the garment element, the model element, and the added new element can be adjusted accordingly, so that part of the elements are the same, and the other part of the elements can be changed according to a requirement of the user, thereby generating a set of images according to the requirement of the user.

For example, part of model elements may be maintained the same to ensure that the model remains the same across the generated images, while other model elements may be changed to display different expressions, actions, or poses. Similarly, by keeping some garment elements consistent, the generated images may maintain the same style of garment, while other garment elements may be altered to present different colors or textures. Additionally, by keeping some scene elements the same, the generated images may maintain a consistent background, while other scene elements may be altered to offer different perspectives.

In some embodiments, the modeling module 1 may perform the 3D modeling on the garment and the model using a fashion modeling software such as Style3D Studio. For example, 3D garment modeling is performed first, and then the user may select either a digital model or a mannequin model for the creation of the 3D model.

In some embodiments, the modeling module 1 may include a garment modeling unit 11 and a model modeling unit 12. The garment modeling unit 11 may be configured to construct a 3D garment model by performing the 3D modeling on the garment. The model modeling unit 12 may be configured to provide a user with an option to customize a digital model and generate the 3D model by performing garment simulation in modeling software based on the 3D garment model and a customized digital model; or provide the user with a plurality of mannequin models to select, and generate the 3D model by simulating the 3D garment model and a mannequin model selected by the user to a stable state via a modeling software.

In some embodiments, the modeling module 1 may also model a scene while modeling the garment and the model, or the modification module 4 may add a scene element to automatically generate an image scene. As used herein, garment elements, model elements, and scene elements may be collectively referred to as image elements of the rendered image.

When the modeling module 1 is modeling the scene at the same time as modeling the garment and the model, the modeling module 1 may further include a scene modeling unit 13 configured to preset a scene compatible with the garment and the model to generate the 3D model including the scene when generating the 3D model. Correspondingly, the parsing module 3 may include a garment parsing unit 31 configured to parse the garment element of the rendered image, a model parsing unit 32 configured to parse the model element of the rendered image, and a scene parsing unit 33 configured to parse the scene element of the rendered image.

As a result, different presentation effects of the garment on different models (e.g., with different features such as hairstyles, face shapes, expressions, and postures) can be achieved, offering a more vivid and realistic portrayal of the garment's effect. At the same time, the presentation scene of the garment can be customized, such as beaches, street photography, or fashion shows, which helps to enhance the focus on different aspects of the garment for different audiences.

In some embodiments, the modification module 4 may include: an encoder 41 (also referred to as a first encoder) configured to encode the rendered image to obtain an encoded rendered image; an adjustment unit 42 configured to modify the encoded rendered image by performing at least one of adjusting the garment element, adjusting the model element, or the adding the new element to obtain a modified image; and a decoder 43 (also referred to as a first decoder) configured to decode the modified image to obtain a finished image.

It should be noted that the encoder 41 may convert network computation from a pixel space to a latent space, thereby achieving data dimensionality reduction and compression, which helps to reduce the amount of computation. This can enhance the quality of model generation and better control an input condition for the adjustment unit 42. Moreover, the system can be applied to scenarios requiring special perspectives, thereby better meeting different design needs and improving efficiency. As used herein, an encoder refers to a trained machine learning model configured to encode features of an input image to generate a feature vector or a feature tensor representing the input image; and a decoder refers to a trained machine learning model configured to recover the feature vector or the feature tensor into an output image. For the convenience of descriptions, unless the context clearly indicates otherwise, the terms "feature vector" and "feature tensor" are used interchangeably to refer to features of an image. In some embodiments, the encoder and the decoder may form a Variational Autoencoder (VAE). In some embodiments, the encoder 41 and the decoder 43 may be obtained by training an initial model including an initial encoder and an initial decoder using sample images. Each sample image may be input into the initial encoder to obtain a sample feature vector, the sample feature vector may be input into the initial decoder to obtain a predicted output image, a value of a loss function may be determined based on the sample images and the corresponding predicted output images, and the initial model may be iteratively updated until a terminal condition is satisfied. After the terminal condition is satisfied, the encoder 41 and the decoder 43 of the trained model can be obtained.

The element added by the adjustment unit 42 may include a scene element, a character element, text information, etc.

The scene element enables the adjustment unit 42 to modify the scene of the rendered image based on the scene element. Exemplary scene elements include color tone, layout, composition, or the like.

The character element enables the adjustment unit 42 to modify the model based on the character element. Exemplary character elements include age, gender, posture, or the like.

The text information enables the adjustment unit 42 to display the text information on the rendered image, and the text information may include information having a close connection with commerce such as a garment price, a current popular style, a popular trend, a current hotspot, etc., so that the system can be applied to the rapid customized image generation of an online e-commerce platform.

By rapidly generating images from a digital modeling to e-commerce scenarios, the system fully leverages digital modeling capabilities without requiring highly complex model modeling. The system also eliminates the need for traditional tasks such as sample garment production, model shooting, and photo retouching. With a single click, it allows for quick generation of images for e-commerce and rapid content distribution.

In some embodiments, the adjustment unit 42 may include a generative network. It should be noted that the generative network is a machine model with learning capabilities. By utilizing a probabilistic model and a statistical method, the generative network can learn to extract patterns and trends from existing data and use these patterns to generate new data, such as samples of new images, text, audio, or the like.

Embodiment 2

Figure 2:
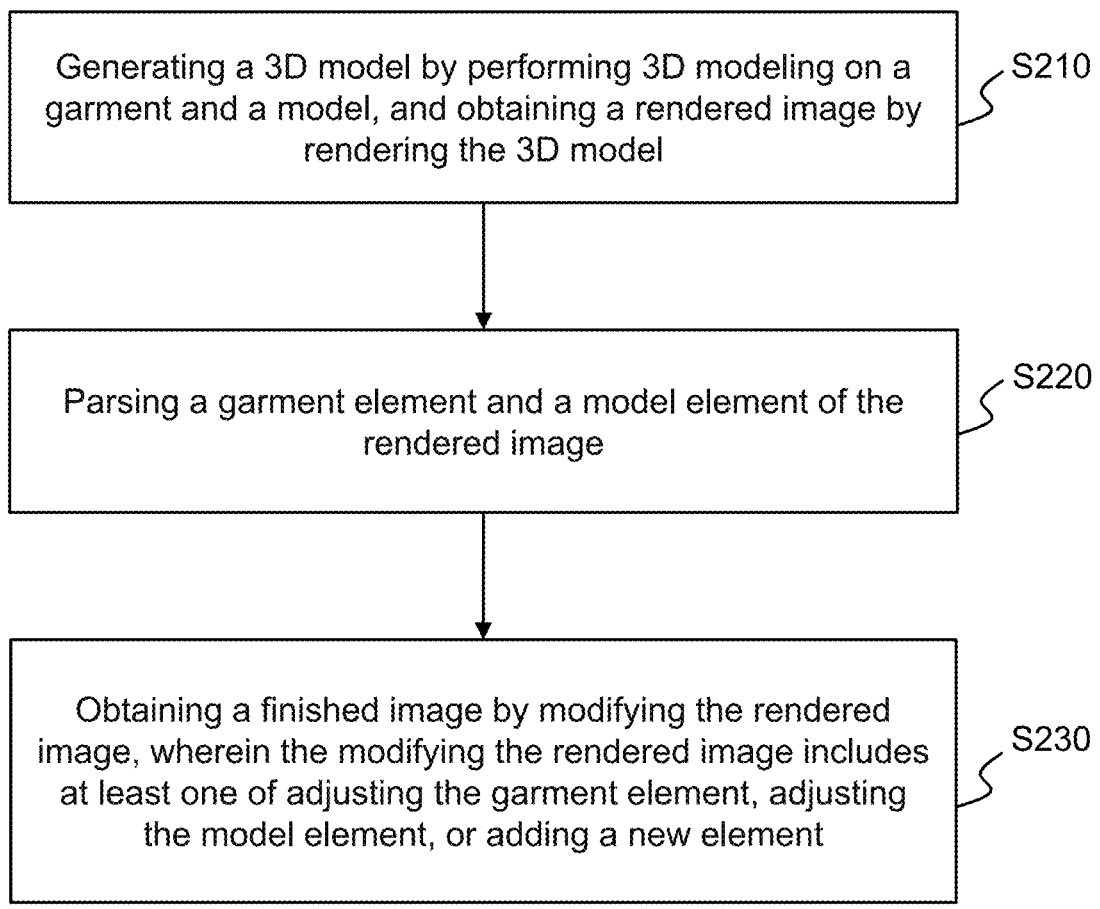
FIG. 2 is a flowchart of an exemplary process for personalized image generation provided in Embodiment 2.

Corresponding to the system for personalized image generation described in Embodiment 1, the present embodiment proposes a method for personalized image generation. As shown in FIG. 2, the method comprises the following operations.

In S210, a 3D model may be generated by performing 3D modeling on a garment and a model, and a rendered image may be obtained by rendering the 3D model.

The rendering of the 3D model described in S210 may include rendering of the garment in the 3D model to make the garment more realistic.

In S220, a garment element and a model element of the rendered image may be parsed.

In some embodiments, the model element may include a skin color, an expression, a posture, a facial contour, a hair style, a body shape, and/or a makeup, etc., of the model; and the garment element may include an outline, a texture, a color, and/or a style of the garment. As used herein, parsing an element refers to extracting features relating to the element.

In S230, a finished image may be obtained by modifying the rendered image, wherein the modifying the rendered image includes at least one of adjusting the garment element, adjusting the model element, or adding a new element.

It should be noted that the finished image obtained by operation S230 may be a single image or a set of multiple images. Through this method, digital modeling capabilities can be fully utilized and highly complex model modeling is not required, while eliminating the need to go through the traditional operations of sampling, modeling, retouching, etc., and realizing rapid image generation and content distribution.

When a user needs to get a set of multiple images, they may adjust the garment element, the model element, and the new element added accordingly, part of the elements in different images are the same, and the other part of the elements in different images can be different according to a requirement of the user, thereby generating the multiple images according to the requirement of the user.

For example, part of the model elements may be maintained the same to ensure that the model remains the same across the generated images, while other model elements may be different in those images to display different expressions, actions, or poses. Similarly, by keeping some garment elements consistent, the generated images may maintain the same style of garment, while other garment elements may be altered to present different colors or textures. Additionally, by keeping some scene elements the same, the generated images may maintain a consistent background, while other scene elements may be altered to offer different perspectives.

Figure 3:
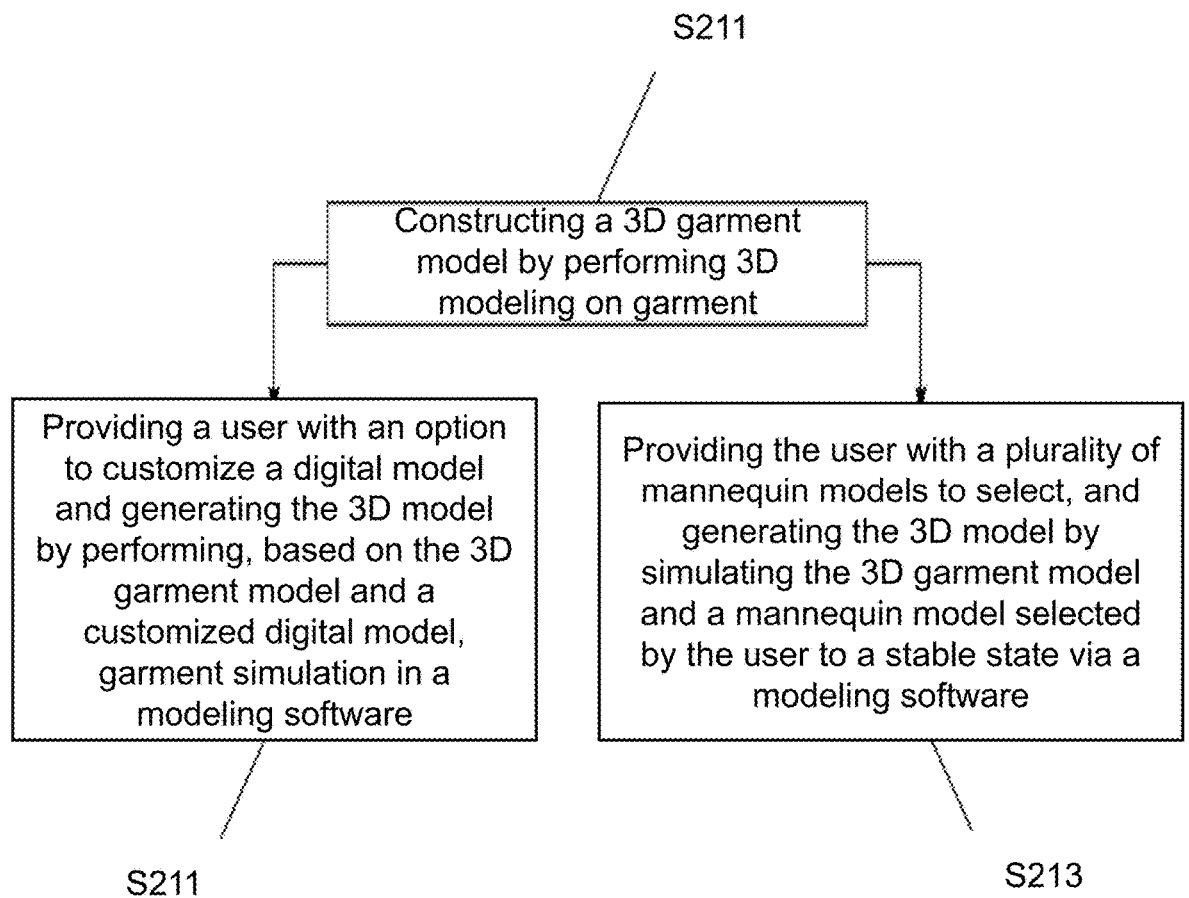
FIG. 3 is a flowchart of an exemplary process for generating a 3D model.

In some embodiments, in operation S210, the 3D modeling on the garment and the model may be performed using fashion modeling software such as Style3D Studio. For example, 3D garment modeling is performed first, and then the user may select either a digital model or a mannequin model to create the 3D model. See FIG. 3, the process of performing 3D modeling on the garment and the model to generate the 3D model and rendering the 3D model to obtain the rendered image described in operation S210 may include the following operations.

In S211, a 3D garment model may be constructed by performing the 3D modeling on the garment.

After operation S211, the user may choose to execute operation S212 or operation S213.

In S212, the user may be provided with an option to customize a digital model and the 3D model may be generated by performing garment simulation in a modeling software based on the 3D garment model and the customized digital model.

In S213, the user may be provided with a plurality of mannequin models to select, and the 3D model may be generated by simulating the 3D garment model and a mannequin model selected by the user to a stable state via a modeling software.

In some embodiments, when generating the 3D model in operation S210, a scene compatible with the garment and the model may be pre-set to generate the 3D model including the scene, and when parsing the garment element and the model element of the rendered image in operation S220, a scene element of the rendered image may be parsed at the same time, so that the rendered image may be modified by adjusting the scene element in operation S230. Alternatively, the image scene may be generated by directly adding the scene element in operation S230.

Figure 4:
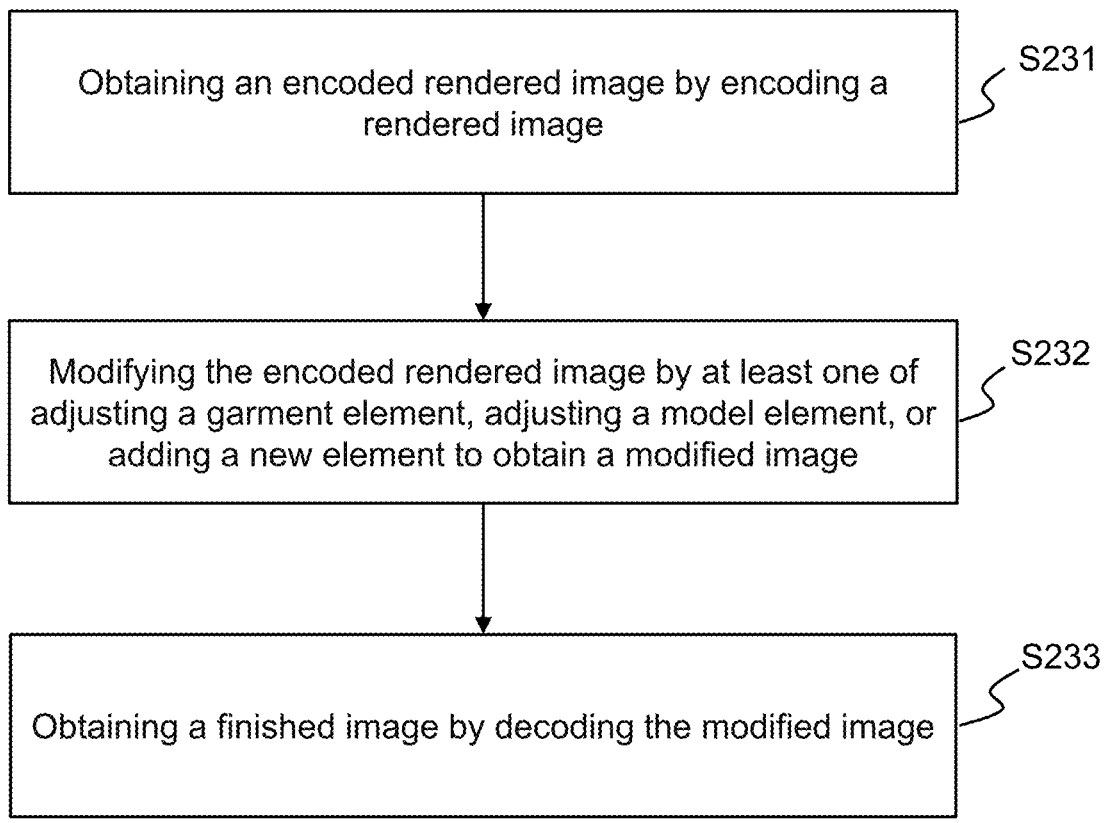
FIG. 4 is a flowchart of an exemplary process for obtaining a finished image.

As shown in FIG. 4, operation S230 may include the following operations.

In S231, the rendered image may be encoded to obtain an encoded rendered image. Encoding the rendered image is a process of extracting features of the rendered image. The encoded rendered image may be also referred to as an encoded feature vector representing the rendered image. In some embodiments, the rendered image may be encoded using the encoder 41. In some embodiments, S220 in FIG. 2 may be omitted, and the garment element and the model element, as well as other elements, may be parsed by performing S231.

In S232, the encoded rendered image may be modified by at least one of adjusting the garment element, adjusting the model element, or the adding the new element to obtain a modified image. As described above, the decoded rendered image is the encoded feature vector representing the rendered image, and the modified image is a modified encoded feature vector.

In S233, the finished image may be obtained by decoding the modified image.

The operation S231 may be realized by an encoder (e.g., the encoder 41), which converts network computation from a pixel space to a latent space, thereby achieving data dimensionality reduction and compression, which helps to reduce the amount of computation. This can enhance the quality of model generation and better adjust or add each element, which enables the method to be applied to some occasions that require special perspectives, thereby better meeting different design needs and improving efficiency.

In addition, the modification of the rendered image by adding the new element as described in operation S232 may include at least one of: adding a scene element to modify a scene of the rendered image based on the scene element, adding a character element to modify the model based on the character element, adding text information to display the text information on the rendered image. The scene element may include elements such as a color tone, a layout, matching of the scene, or the like. The character element may include elements such as age, gender, posture, or the like of the model. The text information may include information having a close connection with commerce such as a garment price, a current popular style, a popular trend, a current hotspot, etc.

In the present embodiment, operation S232 may be realized by a generative network. It should be noted that the generative network is a machine model with learning capabilities. By utilizing a probabilistic model and a statistical method, the generative network can learn to extract patterns and trends from existing data and use these patterns to generate new data, such as samples of new images, text, audio, or the like.

The technical solution proposed in some embodiments of the present disclosure has a wide range of applications. For example, when applied to rapid customized image generation in online e-commerce platforms, the method can satisfy a generative AI technical operation required for content distribution in e-commerce scenarios by processing and producing materials for 3D digital modeling of garments, models, and scenes, and utilizing the operation to facilitate the rapid, high-quality, and personalized customization of e-commerce model images and sets of images.

As seen from the aforementioned Embodiments 1 and 2, the system for personalized image generation provided in the present disclosure has the capability to parse various elements, enabling the user to obtain more realistic and lifelike images according to their needs and preferences. The user can customize the rendered image by adjusting the garment element and the model element, or adding the new element to accurately present the effect of the garment on the model.

Furthermore, different presentation effects of the garment on different models (e.g., with different features such as hairstyles, face shapes, expressions, and postures) can be achieved, offering a more vivid and realistic portrayal of the garment's effect. At the same time, the presentation scene of the garment can be customized, such as beaches, street photography, or fashion shows, which helps to enhance the focus on different aspects of the garment for different audiences.

In some embodiments, this solution can be applied to rapid image customization on an online e-commerce platform. By leveraging digital modeling capabilities from digital modeling to rapid rendering in e-commerce scenarios, the need for high-complexity model modeling and traditional procedures like sample garment, model photoshoots, and retouching is eliminated, thereby enabling rapid e-commerce image generation and swift content distribution with just one click.

In summary, the system and the method for personalized image generation provided in the present disclosure enable the high-quality rapid generation of garment images, enhancing image generation and content distribution efficiency as well as meeting marketing needs. The system and method for personalized image generation maintain a high degree of fidelity for modeled garments, are not complex to operate, significantly reduce time and labor costs, and have a relatively wide range of applications.

Embodiment 3

The present embodiment proposes another system for personalized image generation. The system may comprise an acquisition module, a parsing module, and a modification module.

The acquisition module is configured to obtain a rendered image, the rendered image at least including a model element and a garment element.

The parsing module is configured to parse the garment element and the model element of the rendered image.

The modification module is configured to receive an adjustment instruction for the garment element and/or the model element, so as to modify the rendered image to obtain a finished image.

Figure 5:
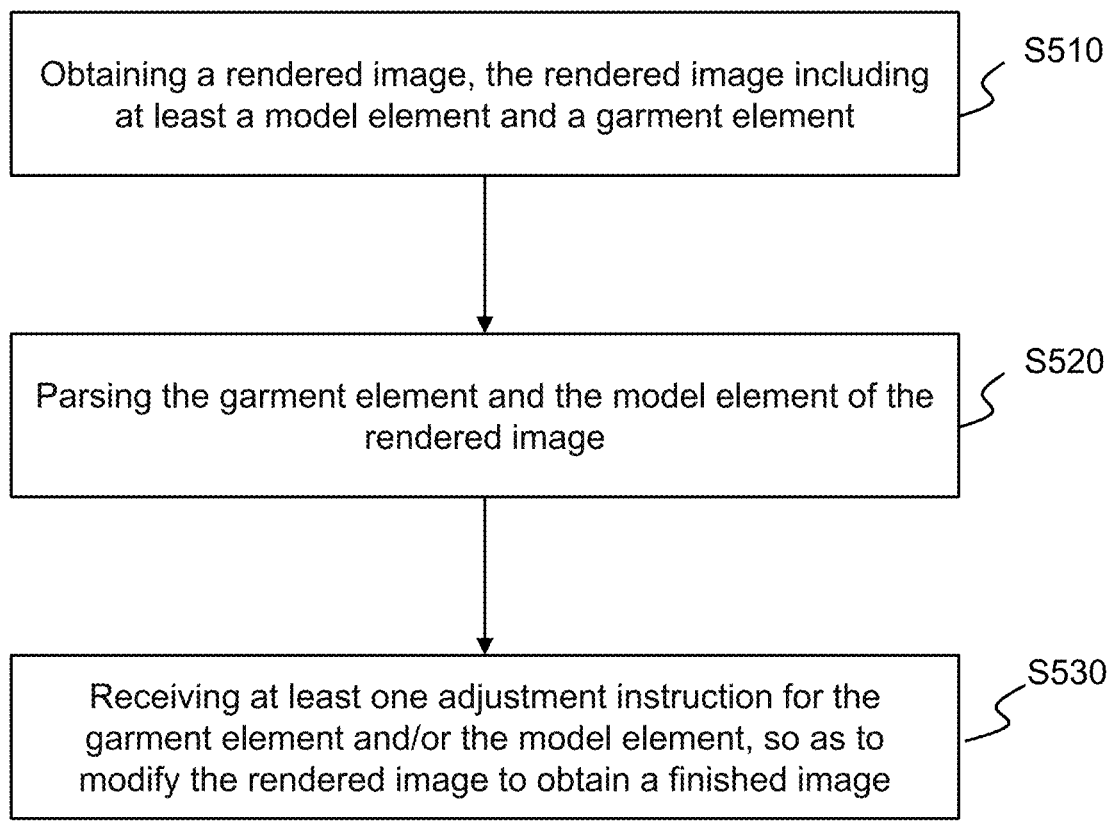
FIG. 5 is a flowchart of an exemplary process for personalized image generation provided in Embodiment 3.

Correspondingly, the present embodiment proposes another method for personalized image generation. As shown in FIG. 5, the method comprises the following operations.

In S510, a rendered image may be obtained, the rendered image including at least a model element and a garment element. In some embodiments, the rendered image may further include a scene element.

It should be noted that the rendered image includes at least the model element and the garment element, i.e., the rendered image obtained in operation S510 includes at least a model and a garment. Similar to operation S210, in some embodiments, the rendered image may be obtained by performing 3D modeling on the garment and the model to generate a 3D model and rendering the 3D model, or the rendered image may be obtained by receiving a rendered image directly input by a user, the rendered image directly input by the user including at least the model element and the garment element.

In S520, the garment element and model element in the rendered image may be parsed. In some embodiments, the parsing of the garment element and model element may be performed using the encoder 41.

In some embodiments, in operation S520, the garment element and the model element of the rendered image may be parsed through a preset designation and/or an image analysis algorithm, and the preset designation is implemented based on configuring a modeling tag.

In S530, an adjustment instruction for the garment element and/or the model element may be received, so as to modify the rendered image to obtain a finished image. In some embodiments, when the rendered image includes the scene element, the adjustment instruction may be used to modify the scene element. In some embodiments, the adjustment instruction relates to at least one image element of the rendered image.

For example, the adjustment instruction includes user inputs including an editing region, an attribute option, an element option, or the like, and the modification of the rendered image in operation S530 may include determining a feature value to be modified based on the adjustment instruction.

In some embodiments, operation S530 may be realized through an element editing interface. For example, the element editing interface includes at least one editing region corresponding to the garment element and the model element, wherein a user can input the adjustment instruction via the at least one editing region.

As another example, the element editing interface includes an element option and an attribute option for receiving the adjustment instruction input by the user. The element option is provided for the user to select an element to adjust from the garment element and/or the model element, the attribute option is provided for the user to set an attribute of the selected element. The element option may correspond to the modeling tab, and the attribute option corresponds to the element option. For example, a corresponding relationship between element options and attribute options may be predefined, one or more attribute options corresponding to each element option may be determined based on the corresponding relationship.

In some embodiments, in operation S530, the user is provided with a quick edit option. After the user enables the quick edit option, the modeling module may further provide editing targets (e.g., via element options), and the user may further select an editing target. According to the editing target selected by the user, the modeling module may retrieve corresponding editing details (e.g., attribute options corresponding to the selected editing target), and the user may control the modeling module to automatically complete editing in the modeling based on the editing details. In some embodiments, after the user enables the quick edit option, the element editing interface may display various element options for the user to select the editing target; after the user selects one element option as the editing target, the element editing interface may display attribute options corresponding to the selected element option for the user to set the attribute of the editing target. For example, if the user wants to quickly edit an eye of a digital model, he/she may enable the quick edit option. The modeling module then provides a list of the various parts of the model (i.e., element options), including parts available for quick edits, such as eyes, mouth, nose, left arm, right arm, etc. When the user selects an eyes button from the list, the modeling module further provides various preset styles for eyes (i.e., attribute options), such as almond eyes, and also offers quick customization options like color (black, white, yellow, etc.), eye width, eye height, and eye spacing. This approach clearly enhances an input efficiency and an input accuracy of the adjustment instruction. In some embodiments, the user can select a region on the rendered image displayed on the element editing interface and enable the quick edit option to quickly edit the element(s) corresponding to the selected region. For example, the user can draw a box on the eye region in the rendered image, and the element editing interface then displays attribute options corresponding to the eyes for the user to set relevant attributes of the eyes.

In some embodiments, if the analysis of the garment element and the model element in the rendered image in operation S520 is performed using a preset manner, i.e., the operation S520 parses the garment element and the model element in the rendered image through the preset manner, or parses the garment element and the model element in the rendered image through the preset manner and the image analysis algorithm at the same time, then the quick edit option described above corresponds to the element option and the attribute option. In other embodiments, the quick edit option corresponds to the element option, the attribute option, and the modeling label.

Figure 6:
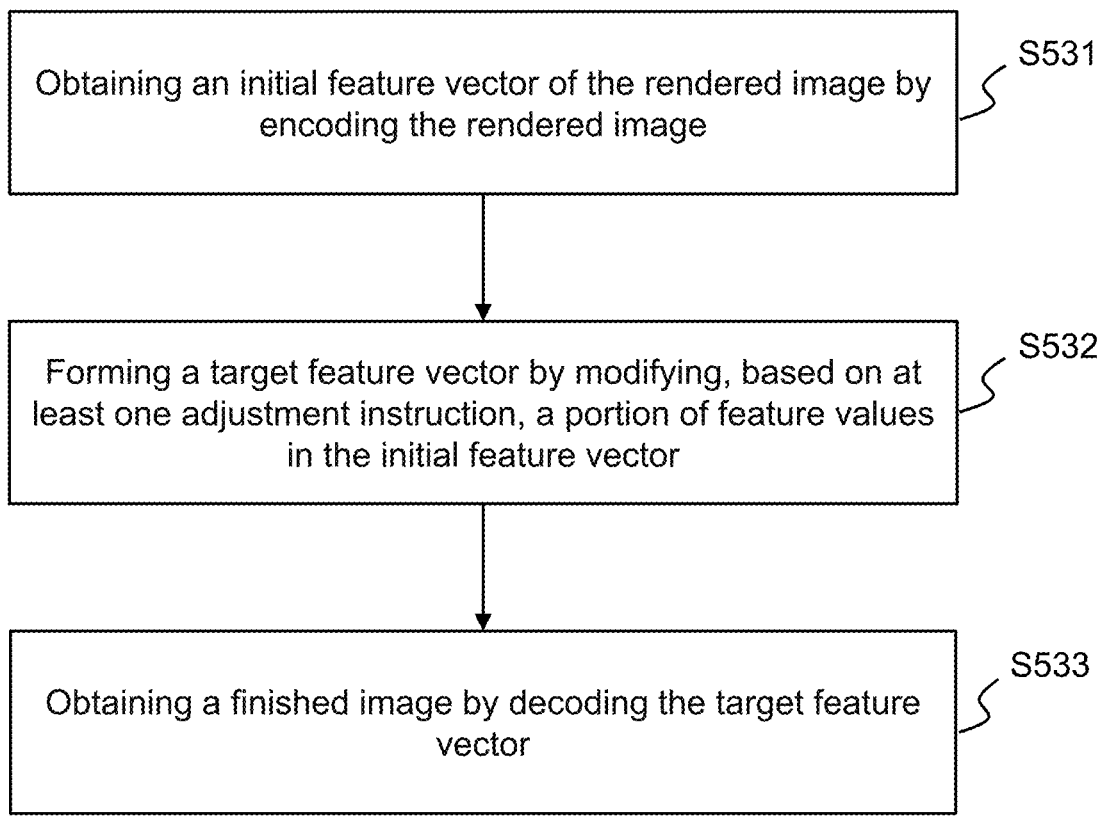
FIG. 6 is a flowchart of an exemplary process for obtaining a finished image by modifying a rendered image provided in Embodiment 3.

Referring to FIG. 6, operation S530 may include the following operations.

In S531, an initial feature vector of the rendered image may be obtained by encoding the rendered image. In some embodiments, the rendered image may be uploaded by a user or be generated by S210. In some embodiments, the rendered image may be encoded using an encoder (e.g., the encoder 41). In some embodiments, S520 in FIG. 5 may be omitted, and the garment element and the model element, as well as other elements, may be parsed by performing S531.

The initial feature vector obtained in operation S531 includes a plurality of feature values, and different feature values correspond to different image elements, e.g., the mouth and eyes of the model have their respective feature values.

In S532, a target feature vector may be formed by modifying, based on the adjustment instruction, a portion of feature values in the initial feature vector. More descriptions regarding the adjustment instruction may be found elsewhere in the present disclosure. See, e.g., operation 530 and relevant descriptions thereof.

In S533, the finished image may be obtained by decoding the target feature vector.

In some embodiments, the element editing interface includes at least one editing region for at least one of the garment element and the model element. For example, when the user inputs the adjustment instruction through the editing region, since the input in the editing region is often text or images, it is necessary to convert the text or images into feature values through a text or image encoder. If the user inputs the adjustment instruction through the attribute option or the element option, as an attribute of an element has corresponding modeling data, in this case, a pre-trained encoder related to modeling is needed to convert the modeling data into the feature values. In some embodiments, various encoders are provided to support multi-modal inputs. After converting the adjustment instruction into the feature values, the feature values related to the adjustment instruction may be integrated with the corresponding feature values in the feature vector of the rendered image. There are multiple ways to integrate, which are not elaborated here. For example, when the user inputs the text "red eyes" through the editing region, a specific encoder may be used to convert the text into a feature value representing the eye color as red and identify a feature value related to eye color expression from the feature vector of the rendered image. By merging the above two feature values, the modification of the feature vector of the rendered image is achieved, thus achieving the modification of the rendered image.

Figure 18:
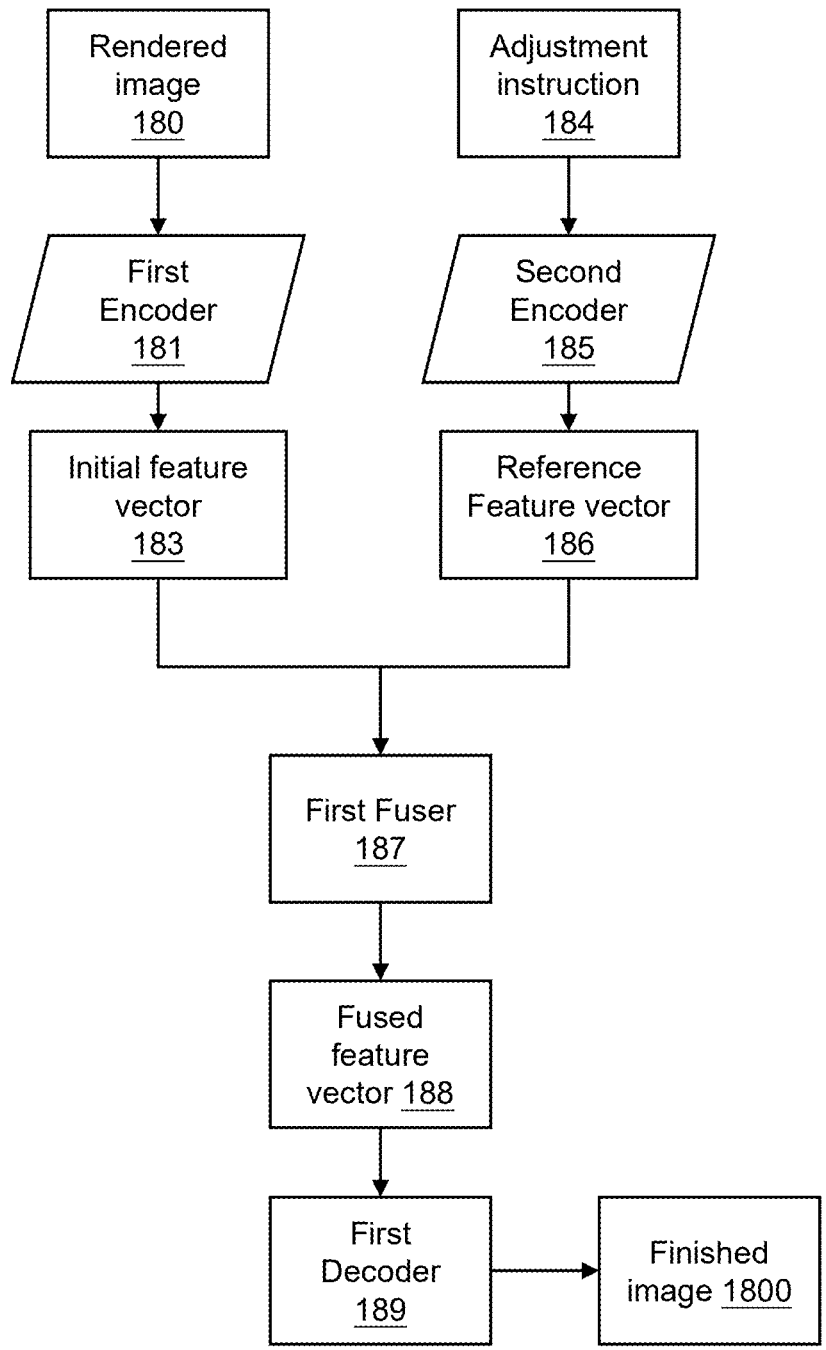
FIG. 18 is a schematic diagram illustrating an exemplary process for generating a finished image according to some embodiments of the present disclosure.

For illustration purposes, FIG. 18 illustrates an exemplary process for generating a finished image 1800 according to some embodiments of the present disclosure.

As shown in FIG. 18, a rendered image 180 may be input into a first encoder 181, and the first encoder 181 may output an initial feature vector 183 representing the rendered image 180. An adjustment instruction 184 in the form of text or images may be input into a second encoder 185, the second encoder 185 may output a reference feature vector 186 representing the adjustment instruction 184. The initial feature vector 183 and the reference feature vector 186 may be input into a first fuser 187 to generate a fused feature vector 188. The fused feature vector 188 may be input into a first decoder 189, and the first decoder 189 may output the finished image 1800. In some embodiments, the rendered image 180 may be a third facial image of a target model face as described in connection with FIG. 7 or 19. In some embodiments, the rendered image 180 may be a first dressing effect image or a second dressing effect image as described in connection with FIG. 11 or 20.

In some embodiments, the first encoder 181, the second encoder 185, the first fuser 187, and the first decoder 189 may be trained jointly by training an initial model using training samples. The initial model may include an initial first encoder, an initial second encoder, an initial fuser, and an initial decoder. Each training sample may include a first sample image and a second sample image, wherein these two sample images only have one or more different elements while other elements are the same. Each training sample may further include a sample adjustment instruction relating to the different element(s). For example, the eyes of the model in the first sample image are black while the eyes of the model in the second sample image are blue; the other model elements, the garment elements, and the scene elements in the first sample image and the second sample image are the same. In such cases, the sample adjustment instruction may be "change the color of the model's eyes into blue." In the training process, the first sample image is input into the initial first encoder to obtain a sample initial feature vector corresponding to the first sample image, the sample adjustment instruction is input into the initial second encoder to obtain a sample reference feature vector corresponding to the sample adjustment instruction, the sample initial feature vector and the sample reference feature vector are input into the initial fuser to obtain a sample fused feature vector, the sample fused feature vector is input into the initial decoder, and the initial decoder output a predicted sample image. The value of a loss function is determined based on the predicted sample image and the second sample image, and the initial model is iteratively updated based on the value of the loss function until a termination condition is satisfied. Exemplary termination conditions include that the loss function converges, the count of iterations reaches a threshold, or the like, or any combination thereof. By jointly training the first encoder 181, the second encoder 185, the first fuser 187 and the first decoder 189, the training efficiency can be improved. The finished image can be generated accurately and efficiently using those models.

In some embodiments, the first encoder 181 and the first decoder 189 may be trained in a similar manner to the encoder 41 and the decoder 43 as described above, the initial second encoder and the initial fuser may be trained jointly based on the first encoder 181 and the first decoder 189. In the training process, only the initial second encoder and the initial fuser need to be updated. For example, the first sample image is input into the first encoder 181 to obtain a sample initial feature vector corresponding to the first sample image, the sample adjustment instruction is input into the initial second encoder to obtain a sample reference feature vector corresponding to the sample adjustment instruction, the sample initial feature vector and the sample reference feature vector are input into the initial fuser to obtain a sample fused feature vector, the sample fused feature vector is input into the first decoder 189, and the first decoder 189 output a predicted sample image. The value of a loss function is determined based on the predicted sample image and the second sample image, and the initial second encoder and the initial fuser are iteratively updated based on the value of the loss function until a termination condition is satisfied.

In addition, the present disclosure proposes a method and a system for customizing a model face based on facial consistency preservation. The method and system are described below in conjunction with Embodiment 4 and Embodiment 5.

Embodiment 4

Figure 7:
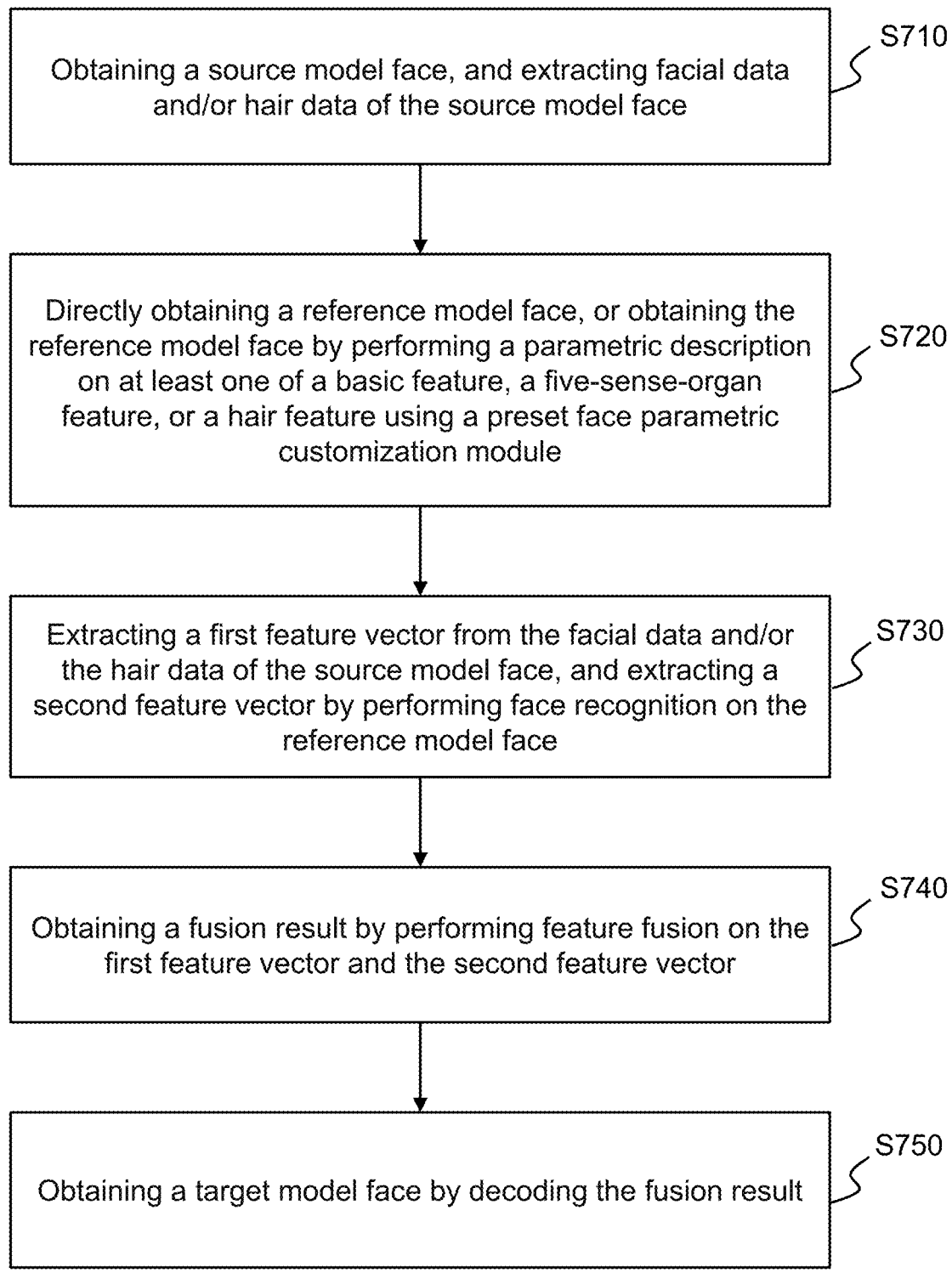
FIG. 7 is a flowchart of an exemplary process for customizing a model face provided in Embodiment 4.

The present embodiment proposes a method for customizing a model face based on facial consistency preservation. The method can effectively preserve the feature consistency of a source model face and a reference model face, achieve high-quality output of a model face, and satisfy highly personalized customization of the reference model face. The specific operations of the method are shown in FIG. 7, and the method includes the following operations.

In S710, a source model face may be obtained, and facial data and/or hair data of the source model face may be extracted. In some embodiments, obtaining the source model face refers to obtaining a first facial image including the face of the source model. The first facial image may only include the face of the source model, or include the face and the other part of the source model. In some embodiments, the facial data and/or hair data include a region including the face and the hair of the source model segmented from the first facial image. In some embodiments, the facial data and/or the hair data include parameters relating to the face and/or the hair of the source model, which will be described in detail in the following descriptions.

In S720, a reference model face may be obtained directly; or the reference model face may be obtained by performing a parametric description on at least one of a basic feature, a five-sense-organ feature, or a hair feature using a preset face parametric customization module. In some embodiments, obtaining the reference model face refers to obtaining a second facial image including the face of the reference model. The reference model and the source model are two models whose images need to be fused. The second facial image may only include the face of the reference model, or include the face and the other part of the reference model.

In some embodiments, the performing the parametric description includes obtaining facial description text (e.g., facial description text) of the at least one of the basic feature, the five-sense-organ feature, or the hair feature; and generating the second facial image based on the facial description text. The facial description text may include words, sentences, or feature values describing the basic feature, the five-sense-organ feature, or the hair feature of the reference model. The facial description text may be input by a user.

In some embodiments, the second facial image may be generated based on the facial description text using a generative algorithm. For example, the second facial image is generated using a generator, which is a trained machine learning model. For example, the facial description text may be input into the generator and the generator may output the second facial image including the reference mode face that is consistent with the facial description text. The generator may be generated by training an initial generator using sample facial images of sample models and corresponding sample facial description text. In the training process, the sample facial description text is input into the initial generator to obtain predicted facial images, a value of a loss function may be determined based on the predicted facial images and the sample facial images, and the initial generator may be iteratively updated based on the loss function until a termination condition is satisfied. In some embodiments, the generator may incorporate a token processing mechanism, which will be described in detail in the following descriptions.

In S730, a first feature vector may be extracted from the facial data and/or the hair data of the source model, and a second feature vector may be extracted by performing face recognition on the reference model face.

In S740, a fusion result may be obtained by performing feature fusion on the first feature vector and the second feature vector.

In S750, the fusion result may be decoded to obtain a target model face. In some embodiments, obtaining the target model face refers to obtaining a third facial image including the face of the target model. The face of the target model is generated by fusing the face of the source model and the face of the reference model.

In some embodiments, the fusion result is a latent representation.

In some embodiments, after operation S750, the method further includes the following operations.

In S760, the recognizability and expressiveness of the target model face may be optimized and enhanced using a face beautification module after the target model face is obtained.

This embodiment provides a source model face and a reference model face and fuses an identity feature of the reference model face with an attribute feature of the source model face to maintain facial feature consistency during face feature transplantation. It should be noted, that the above fusion is not a simple face replacement, but rather, personalized and distinguishing features of the source model face and the reference model face are preserved. Features on the final generated model face are fused in some way, and do not originate from a single face alone. In other words, the fused target model face is a new model including the distinguishing feature of the source model face and the distinguishing feature of the reference model face.

The attribute feature refers to some inherent characteristics of a human face, which may include structural features, facial expression features, skin color and texture features, and other features. The structural features relate to the structure of the human face, such as the location, size, and shape of the eyes, mouth, nose, eyebrows, ears, or the like. The facial expression features relate to facial expressions that express a wide range of emotions and moods, such as joy, anger, sadness, happiness, or the like. The skin color and texture features relate to the skin color and the facial texture of the human face. Other features of the human face include a face shape, a facial contour, etc.

The identity feature refers to unique individual characteristics of each person. Specifically, the identity feature may include 3D features of the face, color and texture features of the human face, micro-expression features of the human face, or the like. The 3D features of the face relate to an overall shape of the human face, which may include a relative position and a size of each facial organ, or the like. The color and texture features of the human face may include a skin color, a skin tone, a facial texture, etc., of the human face. The micro-expression features of the human face relate to subtle expressions that the human face shows in a short period of time, which are usually unconscious but may be recognized and parsed by machine learning and an image processing technique.

The distinguishing feature may be understood as personalized features of the model face, such as unique hairstyles, maverick makeup, etc. The distinguishing feature makes the model have a sense of superiority. There is no criterion for the sense of superiority itself, and there is no specific means of quantifying distinguishing features. Therefore, the distinguishing feature may be chosen subjectively, and any feature that the user feels they want to customize on the model face may be considered as a distinguishing feature. A sense of superiority is a manifestation of the unique qualities of the model. The solution of the present embodiment realizes the customization of the model face while retaining the unique and distinguishing feature on the model face, so that the generated target model face is equipped with a sense of superiority. Features possessing individuality on the source model face and the reference model face are selected as the distinguishing features, respectively, and the distinguishing features include the identity feature of the source model face and the identity feature of the reference model face. The resulting latent representation then includes the distinguishing feature, a fused feature of a distinguishing feature of the source model face and a distinguishing feature of the reference model face, and a fused feature of a non-distinguishing feature of the source model face and a non-distinguishing feature of the reference model face, so that the final generated customized face has the personalized features of the source model face and the reference model face, and a model face with a sense of superiority is obtained.

Figure 8:
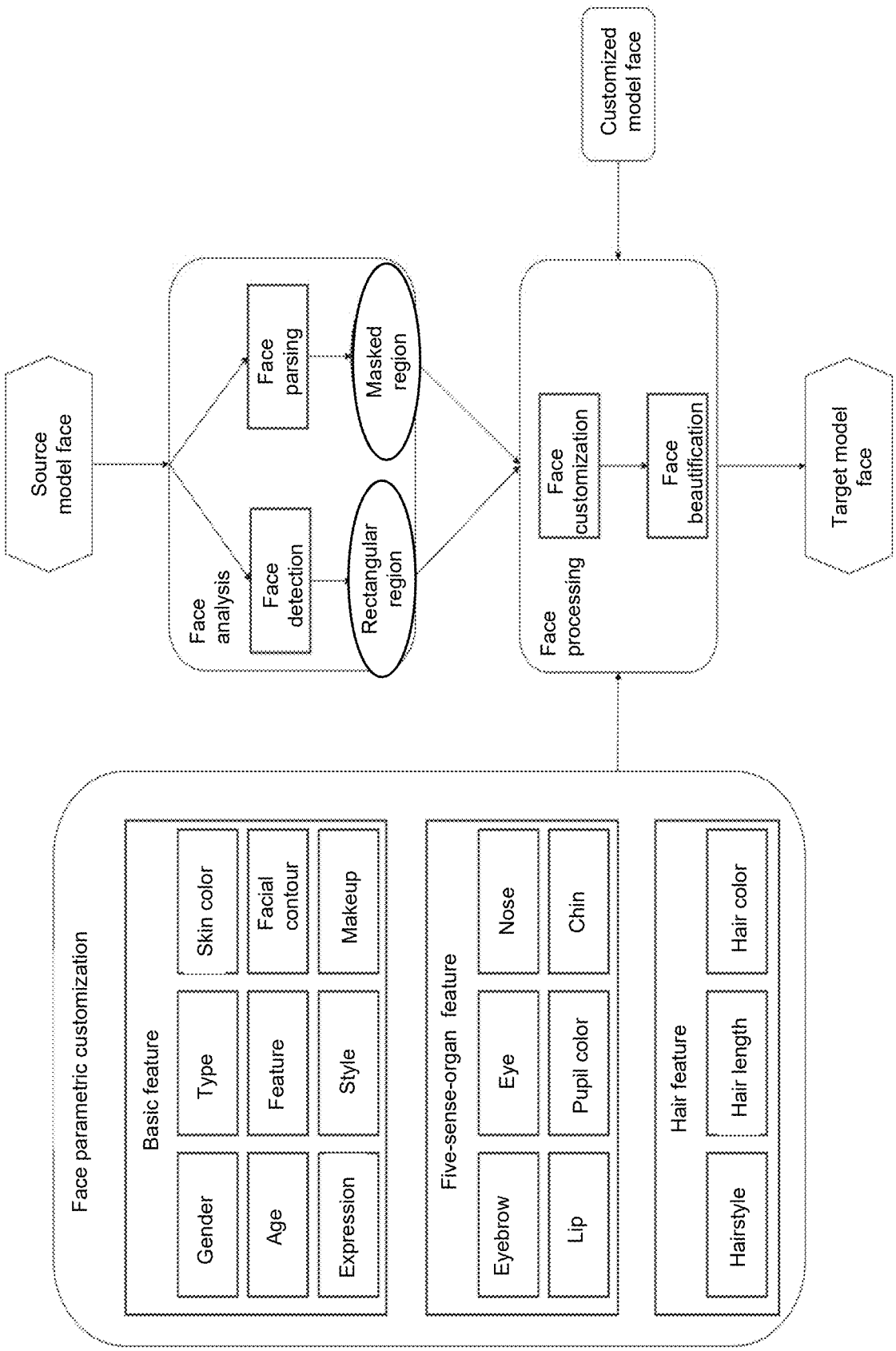
FIG. 8 is a schematic diagram of a principle of the method for customizing a model face provided in Embodiment 4.

Specifically, once the source model face is provided, it is necessary to perform a face analysis on it to efficiently locate the model face and extract facial data and/or hair data of the source model face. Algorithms such as face key points, face segmentation, or the like may be used, as shown in FIG. 8. In practical applications, multiple algorithms may be combined to obtain a best face detection result. For example, a rectangular region is delineated on the source model face to determine a location of the region and a feature within the region, or to obtain masked region data for the source model face. The facial data includes at least a face contour, a face type, and details of various parts of the face. The present embodiment uses a face analysis algorithm to divide the face into regions, then it is necessary to determine the location, type, and size of the regions, and the features within the regions. The hair data mainly refers to the position, color, and shape of the hair in the source model face, and other data related to the hair may be included in the hair data. Subsequent feature transplantation is performed in a face region and/or a hair region, so it is important to obtain relevant information thereof to facilitate subsequent face transplantation.

The reference model face may be understood as a target of the target model face. The reference model face may be input in two ways. One way is to directly input the reference model face, e.g., the user directly inputs an image of an eligible reference model face to a software or generates a corresponding image based on given data of the reference model face. The other way is to obtain the image of a specific reference model face through a face parametric customization module. The face parametric customization module differs from traditional facial customization schemes by systematically and meticulously detailing the attributes of each dimension. The face parametric customization module also addresses a confusion that arises due to a coupling relation between attributes in descriptions of the attributes.

In some embodiments, as shown in FIG. 8, the face parametric customization module describes a customized model from three dimensions: a basic feature, a five-sense-organ feature, and a hair feature. The basic feature involves fundamental information affecting the face, including gender, age, expression, skin color, face shape, makeup, facial detail, facial contour, model style, etc. The facial detail mainly refers to fine features such as wrinkles on the face. The model style may affect subsequent feature description coupling issues, as faces of models with different styles may correspond to different feature descriptions. The five-sense-organ feature includes features of an eyebrow, a mouth, an eye, a nose, an ear, lips, pupil color, nose, and chin, and these features are all customizable. The hair feature includes a hairstyle, a hair color, and a hair length. By realizing the global feature customization of a model face from the three dimensions including the basic feature, the five-sense-organ feature, and the hair feature, and by refining the detailed features under each dimension, it is possible to uniquely design fine-grained detailed features, thus creating a unique model face expression.

The face parametric customization module forms a parameterized description of the model face based on the basic feature, the five-sense-organ feature, and the hair feature. This description may be set according to a specific reference model facial image or based on application experience to meet the customization needs of the model face. The face parametric customization module may accommodate highly personalized customization of reference model faces, thereby realizing applications in more demand scenarios. For parameterized descriptions, generative algorithms such as a generative adversarial network (GAN), a diffusion model, etc., are used to generate model faces that meet feature requirements, thereby effectively achieving the uniqueness and aesthetic visual effects of the model face.

In a specific embodiment, in the face parametric customization module, the parametric description is performed by describing each feature attribute of the facial image through descriptive words, and a token processing mechanism is pre-constructed to process descriptive confusions of the feature attributes caused by a coupling relationship between the feature attributes regarding the descriptive words. The token processing mechanism may associate a facial feature with a general description of the feature, thus avoiding the confusion of the feature attributes caused by a coupling relationship between the feature attributes. The token processing mechanism establishes a differentiation between a neighboring descriptive word of a feature attribute and a non-neighboring descriptive word of the feature attribute, giving a higher weight to the neighboring descriptive word and a lower weight to the non-neighboring descriptive word, analogous to intra-cluster and inter-cluster spacing issues in clustering problems. The neighboring descriptive word of the feature attribute refers to a descriptive word that is often or normally used to describe the feature attribute, and the non-neighboring descriptive word of the feature attribute refers to a descriptive word that is rarely used to describe the feature attribute For example, for "red eyebrows" and "light-colored lips," the token processing mechanism associates "red" with "eyebrows" and "light-colored" with "lips," thus avoiding confusion issues caused by coupling between the feature descriptions like "red lips" or "light-colored eyebrows." The "light-colored" is a neighboring descriptive word of eyebrows and a non-neighboring descriptive word of lips, while "red" is a neighboring descriptive word of lips and a non-neighboring descriptive word of eyebrows.

Further, a facial feature description mechanism with general rationality may be pre-constructed. The facial feature description mechanism may represent the description of facial features under general aesthetics. For example, the commonly recognized lip color is red rather than black, and thus red lips are included in the facial feature description mechanism. In other words, the facial feature description mechanism represents the usual recognition and aesthetic of facial features by a majority of people. Subsequently, it is necessary to integrate the facial feature description mechanism with the style requirement of the face of the fused digital model (hereinafter referred to as a fused model face) to establish the neighboring descriptive word and the non-neighboring descriptive word for each feature attribute. Given that the facial feature description mechanism only represents general cognition, there are models with special styles whose advanced looks are attributed to their facial uniqueness. Therefore, this embodiment considers such models with special facial styles. If the style of the fused model face is unique, a proportion of the model style increases significantly, while a proportion of the facial feature description mechanism is appropriately reduced, and some descriptions may even be modified. Finally, through the token processing mechanism, the differentiation between the neighboring descriptive word and the non-neighboring descriptive word is strengthened, thereby increasing the weight among neighboring descriptive words and decreasing the weight among non-neighboring descriptive words, thus reducing the impact of the non-neighboring descriptive words on feature attribute description and lowering the probability of descriptive confusion.

Figure 9:
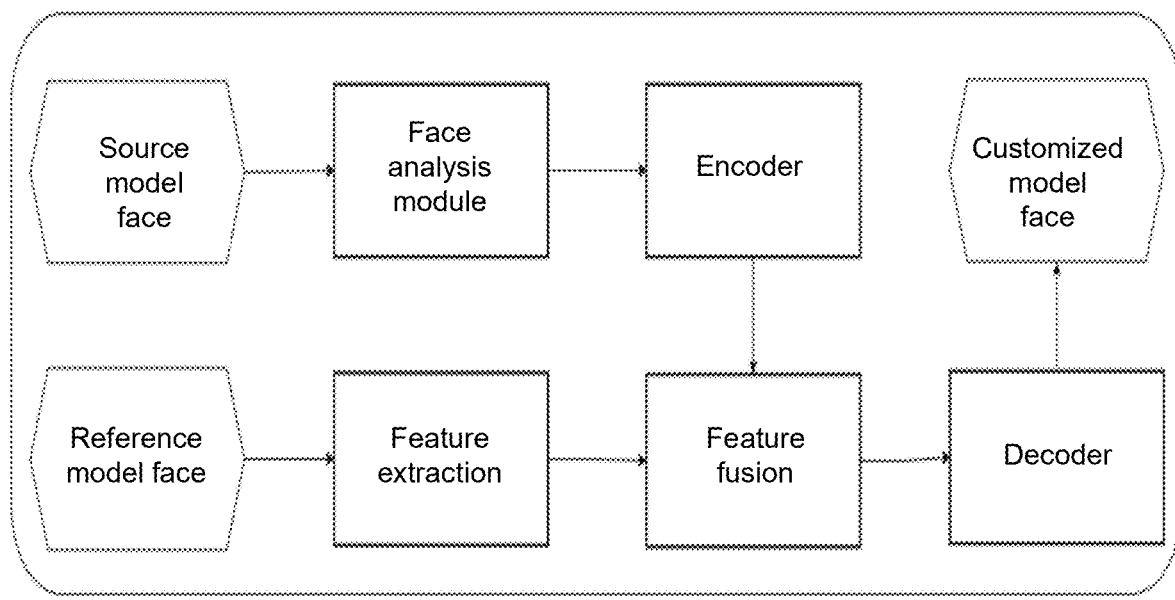
FIG. 9 is a schematic diagram of a feature fusion operation provided in some embodiments of the present disclosure.

After obtaining the reference model face and the source model face, the subsequent processing may be carried out in accordance with the process shown in FIG. 9, and the customized model face in FIG. 9 is the output target model face. An encoder (e.g., a third encoder) may be configured to process the source model face after face parsing to obtain a feature vector representation of the source model face. The encoder may be also configured to process and extract a feature vector representation of the reference model face. In some embodiments, the encoder may be a convolutional neural network (e.g., ResNet). In the training process of the encoder, an Arcface loss function is used to better achieve inter-class separation and intra-class aggregation of model faces, which helps convert critical information in the images into feature vectors, thereby effectively representing the features of the model face images. The feature vectors of the reference model face and the source model face are decoupled and merged, with feature filling carried out based on delineated facial areas within the data.

Specifically, the decoupling of the feature vectors of the source model face and reference model face allows for the separation of features between the source model face and reference model face, and the merge of the feature vectors combines these feature vectors, resulting in a new latent representation. The new latent representation encapsulates both the features of the source model face and the reference model face, as well as other representational information from the source model face and the reference model face. The latent representation stores relevant features in the form of feature vectors.

Features corresponding to a feature vector in the latent representation include a distinguishing feature, a fused feature of a distinguishing feature of the source model face and a distinguishing feature of the reference model face corresponding to a same feature attribute, and a fused feature of a non-distinguishing feature of the source model face and a non-distinguishing feature of the reference model face corresponding to the same feature attribute. For the same feature attribute, the distinguishing feature may appear in only the source model face or the reference model face, or in both the source model face and the reference model face. If the distinguishing feature appears only in the source model face or the reference model face, no fusion is needed, and the distinguishing feature may directly be retained on the target model face. However, if both the source model face and the reference model face have distinguishing features related to a same feature (e.g., a feature of the eyes), some embodiments fuse the distinguishing features of the source model face and the reference model face to preserve the features of both the source model face and the reference model face, and the fused feature is then retained on the target model face. The non-distinguishing features may be fused or selectively retained based on actual conditions.

Afterward, a decoder may be configured to decode the fused feature vector, and obtain a target model face that aligns with the features of both the source model face and the reference model face. This effectively retains consistency in facial features of the models, achieving customization of the model face features. Additionally, to further achieve high-quality model face customization, a facial beautification module is configured to enhance an effect of the target model face. Specifically, algorithms such as super-resolution, detail optimization and enhancement, and beautification improve the recognizability and expressiveness of the model face, making its contours, features, and skin tone more refined and vivid.

Based on consistency information of the model face, the customization scheme of the embodiment allows for model face customization across batch images such as group photos, series photos, image sequences, videos, etc.

This embodiment proposes the method for customizing a model face based on facial consistency preservation, which can quickly output the target model face given the source model and the reference model face, effectively retaining feature consistency, achieving high-quality image output with high resolution and detail richness, and accurately modifying and customizing facial features.

Figure 19:
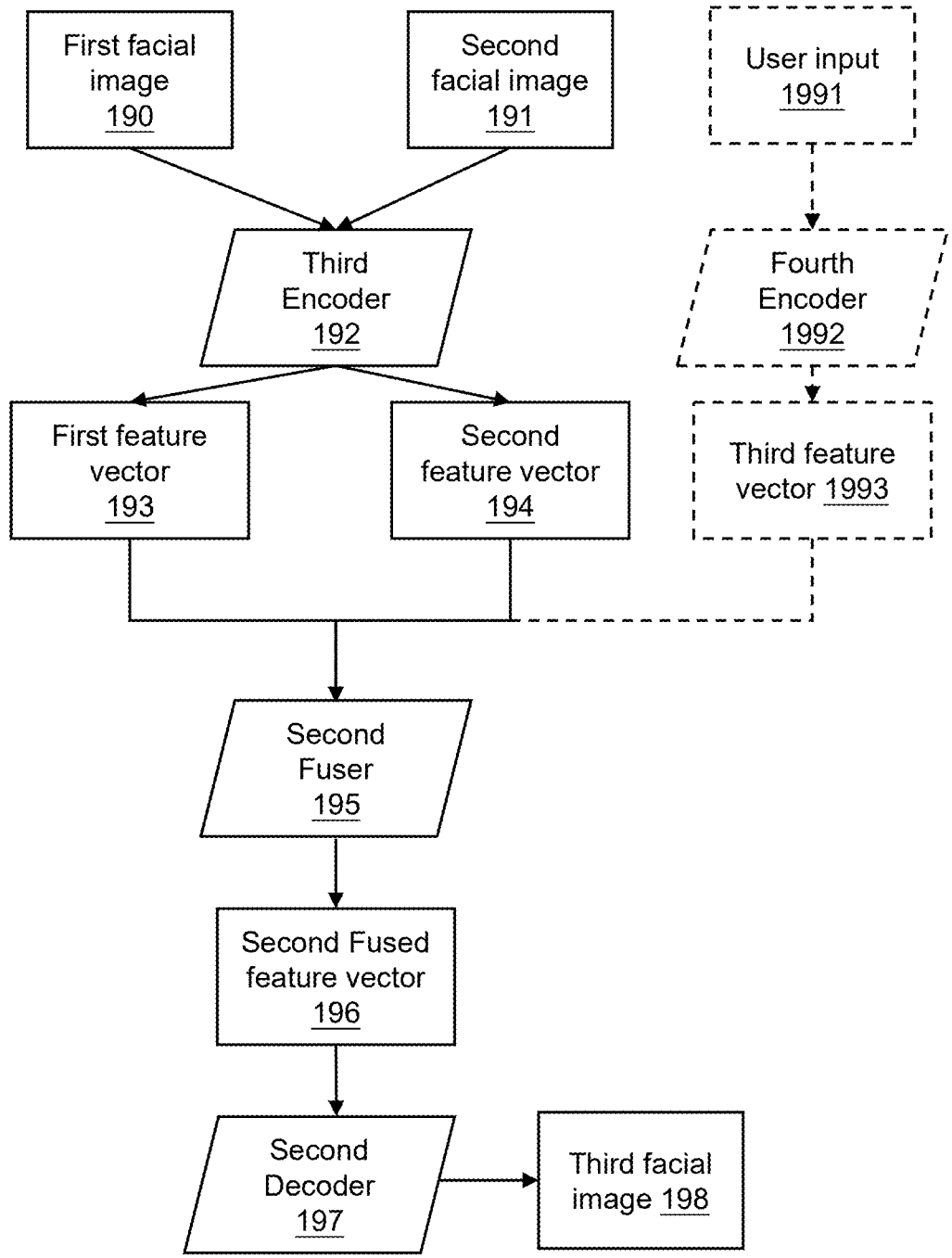
FIG. 19 is a schematic diagram illustrating an exemplary process for generating a third facial image according to some embodiments of the present disclosure.

For illustration purposes, FIG. 19 illustrates an exemplary process for generating a third facial image 198 according to some embodiments of the present disclosure.

As shown in FIG. 19, a first facial image 190 including the source model face and a second facial image 191 including the reference model face are obtained. In some embodiments, the second facial image 191 may be uploaded by a user via a terminal device. Alternatively, the user may input facial description text of the at least one of the basic feature, the five-sense-organ feature, or the hair feature of the reference model face, and the second facial image 191 may be generated based on the facial description text. More descriptions regarding the first and second facial images may be found elsewhere in the present disclosure. See, e.g., FIG. 7 and relevant descriptions thereof. In some embodiments, the second facial image 191 may be a facial image generated by S1110 as described in connection with FIG. 11.

The first facial image 190 may be input into a third encoder 192 to obtain a first feature vector corresponding to the source model face. The second facial image 191 may be input into the third encoder 192 to obtain a second feature vector 194 corresponding to the reference model face. In some embodiments, the third encoder 192 may be the same as the first encoder as described above. In some embodiments, the third encoder 192 may be different from the first encoder. The third encoder 192 is specially designed to process facial images.

The first feature vector 193 and the second feature vector 194 may then be input into a second fuser 195 to obtain a second fused feature vector 196. The second fused feature vector 196 may be input into the second decoder 197 to obtain the third facial image 198 of a target model face. In some embodiments, the second decoder 197 may be the same as the first decoder as described above. In some embodiments, the second decoder 197 may be different from the first decoder. The second decoder 197 is specially designed to process facial images.

In some embodiments, the third encoder 192, the second fuser 195, and the second decoder 197 may be trained jointly by training an initial model using training samples. The initial model may include an initial third encoder, an initial second fuser, and an initial second decoder. Each training sample includes a first sample facial image of a sample source model face, a second sample facial image of a sample reference model face, and a third sample facial image of a sample target model face. The third sample facial image is a user designated or confirmed image that fuses the sample source model face and the sample reference model face.

In the training process, the first sample facial image is input into the initial third encoder to obtain a first sample feature vector corresponding to the first sample facial image, the second sample facial image is input into the initial third encoder to obtain a second sample feature vector corresponding to the second sample facial image, the first sample feature vector and the second sample feature vector are input into the initial second fuser to obtain a second sample fused feature vector, the second sample fused feature vector is input into the initial second decoder, and the initial second decoder output a predicted facial image. The value of a loss function is determined based on the predicted facial image and the third sample facial image, and the initial model is iteratively updated based on the value of the loss function until a termination condition is satisfied. By jointly training the third encoder 192, the second fuser 195, and the second decoder 197, the training efficiency can be improved. The second fuser 195 may learn an optimized mechanism to fuse the features of the source model face and the reference model face, for example, distinguishing features of the source model face and the reference model face may be maintained and fused. The third facial image can be generated accurately and efficiently using those models.

In some embodiments, a user input 1991 may be input by a user via a user terminal, the user input 1991 indicates distinguishing feature(s) of the source model face and/or the reference model face that the user wants to preserve in the target model face. The user input 1991 may be input into a fourth encoder 1992 to obtain a third feature vector 1993. The third feature vector 1993 may be input into the second fuser 195 with the first and second feature vectors. In such cases, the user can flexibly designate the distinguishing feature(s) he/she wants to preserve, and the generated third facial image 198 can better satisfy his/her needs. Accordingly, each training sample may further include a sample user input regarding distinguishing feature(s) of the sample source model face and/or the sample reference model face that a user wants to preserve in the sample target model face. The initial model may further include an initial fourth encoder. In the training process, the sample user input may be input into the initial fourth encoder to obtain a third sample feature vector, which may be also input into the initial second fuser.

In some embodiments, the third encoder 192 and the second decoder 197 may be trained jointly, and the second fuser 195 may be trained based on the third encoder 192 and the second decoder 197.

In some embodiments, an image including the face and the body of the source model may be obtained, and the first facial image 190 and a body image may be segmented from the image of the source model by identifying the face and the body of the source model face from the image. After the third facial image 198 is generated, the third facial image may be fused with the body image of the source model to generate an image of the target model, wherein the target model has a fused face of the source model face and the reference mode face, and the body of the source model.

Embodiment 5

Figure 10:
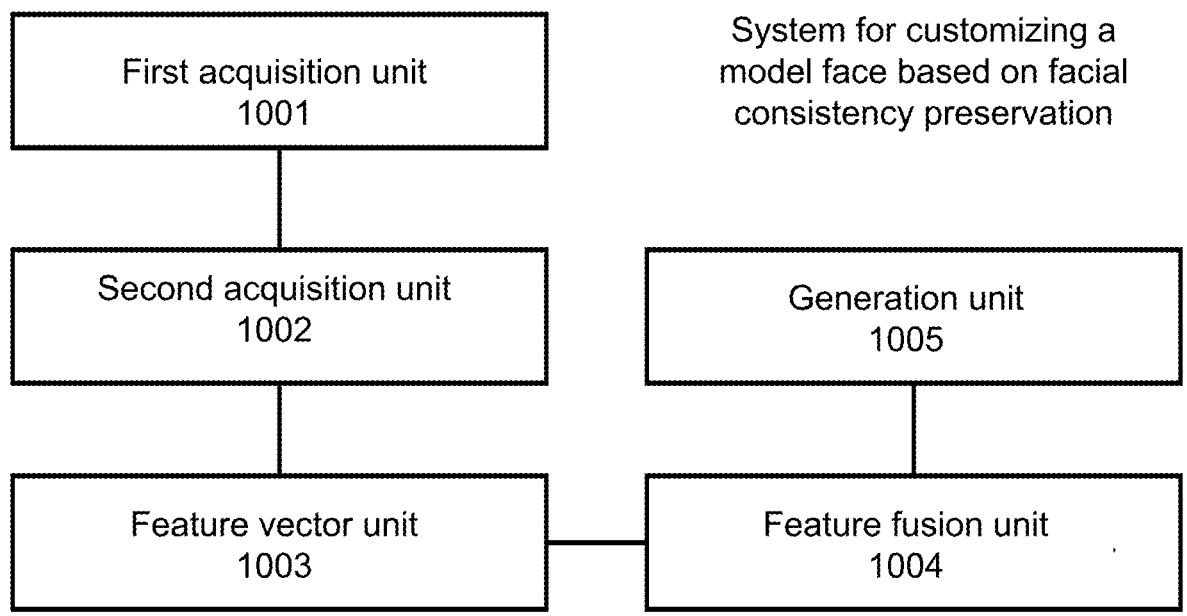
FIG. 10 is a schematic diagram of an exemplary system for customizing a model face provided in Embodiment 5.

The present embodiment proposes a system for customizing a model face based on facial consistency preservation, which systematizes the method for customizing a model face based on facial consistency preservation of Embodiment 4 to make the method more practical. An overall structural diagram of the system is shown in FIG. 10, which includes a first acquisition unit 1001, a second acquisition unit 1002, a feature vector unit 1003, a feature fusion unit 1004, and a generation unit 1005.

The first acquisition unit 1001 is configured to obtain a source model face and extract facial data and/or hair data of the source model face.

The second acquisition unit 1002 is configured to directly obtain a reference model face; or obtain the reference model face by performing a parametric description on at least one of a basic feature, a five-sense-organ feature, or a hair feature using a face parametric customization module.

The feature vector unit 1003 is configured to extract a first feature vector from the facial data and/or the hair data of the source model, and extract a second feature vector by performing face recognition on the reference model face.

The feature fusion unit 1004 is configured to perform feature fusion on the first feature vector and the second feature vector.

The generation unit 1005 is configured to obtain a target model face by decoding the fusion result, and optimize and enhance recognizability and expressiveness of the target model face through a face beautification module.

In the face parametric customization module, the parametric description is performed by describing each feature attribute of the facial image through descriptive words, and a token processing mechanism is pre-constructed to process descriptive confusions of the feature attributes caused by a coupling relationship between the feature attributes regarding the descriptive words.

The solution for model face customization based on facial consistency preservation proposed in the foregoing Embodiment 4 and Embodiment 5 can rapidly output a fused target model face for a given source model face and a reference model face, and effectively preserve the feature consistency of the source model face and the reference model face, thereby achieving high-quality output of the model face. The output model face has a high image resolution and detail-rich model face details, enabling accurate modification and customization of the model face. The face parametric customization module can satisfy highly personalized customization of the reference model face to achieve applications in more demanding scenarios.

As previously mentioned, Embodiment 1, Embodiment 2, and Embodiment 3 disclose solutions for personalized image generation, and Embodiment 4 and Embodiment 5 disclose a solution for customizing a model face based on facial consistency preservation. In the solution for personalized image generation, the rendered image can be modified by adjusting the model element to obtain the finished image. In the solution for customizing a model face, the features of the source model face and the reference model face can be fused through feature fusion to generate the target model face, which can be regarded as a specific implementation of "modifying the rendered image by adjusting the model element" in the model face scenario.

Given that the visible parts of the model in the rendered image in the aforementioned solution for personalized image generation may include other body parts (e.g., hair, neck, limbs, waist, etc.) in addition to the face, the present disclosure also proposes another solution for personalized image generation based on image fusion. The solution includes determining a facial image based on a facial image uploaded by a user or based on face description information specified by the user, and then fusing the facial image with a first dressing effect image to obtain a second dressing effect image, thereby extending the feature fusion technique shown in Embodiment 4 and Embodiment 5 to the entire body of a digital model. The solution for personalized image generation is described below in connection with Embodiment 6 and Embodiment 7.

Embodiment 6

The present embodiment proposes a method for personalized image generation. The method may be applied to a system for personalized image generation shown in Embodiment 7 below, which may include only a client, or a client and a server.

In some embodiments, the method may be applied to 3D model processing software, which may be configured to process 3D models and output images corresponding to the 3D models. When the 3D model processing software supports a 3D modeling function, the 3D model being processed may be generated by the 3D model processing software through the 3D modeling function. When the 3D model processing software does not support the 3D modeling function, the 3D model processing software may receive a 3D model constructed and output by another 3D modeling software, process the 3D model locally, and output a corresponding image thereof.

In another embodiment, the method may be applied to 3D dressing model processing software configured to output dressing effect images obtained based on 3D garment models and digital models. The 3D garment model processed by the 3D dressing model processing software may be obtained by jointly modeling a 3D garment model (obtained by modeling a garment) and a digital model (obtained by modeling a physical model). Similarly to the aforementioned 3D model processing software, when the 3D dressing model processing software supports the 3D modeling function, the 3D garment model being processed may be generated by the software through the 3D modeling function; and when the 3D dressing model processing software does not support the 3D modeling function, the software may receive a 3D garment model constructed and output by another 3D modeling software, process the 3D garment model locally, and output dressing effect images corresponding to the 3D garment model. Specifically, the garment for constructing the 3D garment model may be a target garment described in this embodiment. For example, the 3D dressing model processing software may be Style3D Studio or other software.

It should be noted that the method for personalized image generation may be applied to the aforementioned 3D model processing software or to the aforementioned 3D dressing model processing software. Taking the 3D dressing model processing software as an example, when the system for personalized image generation includes only a client, the client is a client of the 3D dressing model processing software; and when the system for personalized image generation includes a client and a server, the client and the server are the client and server of the 3D dressing model processing software.

Figure 11:
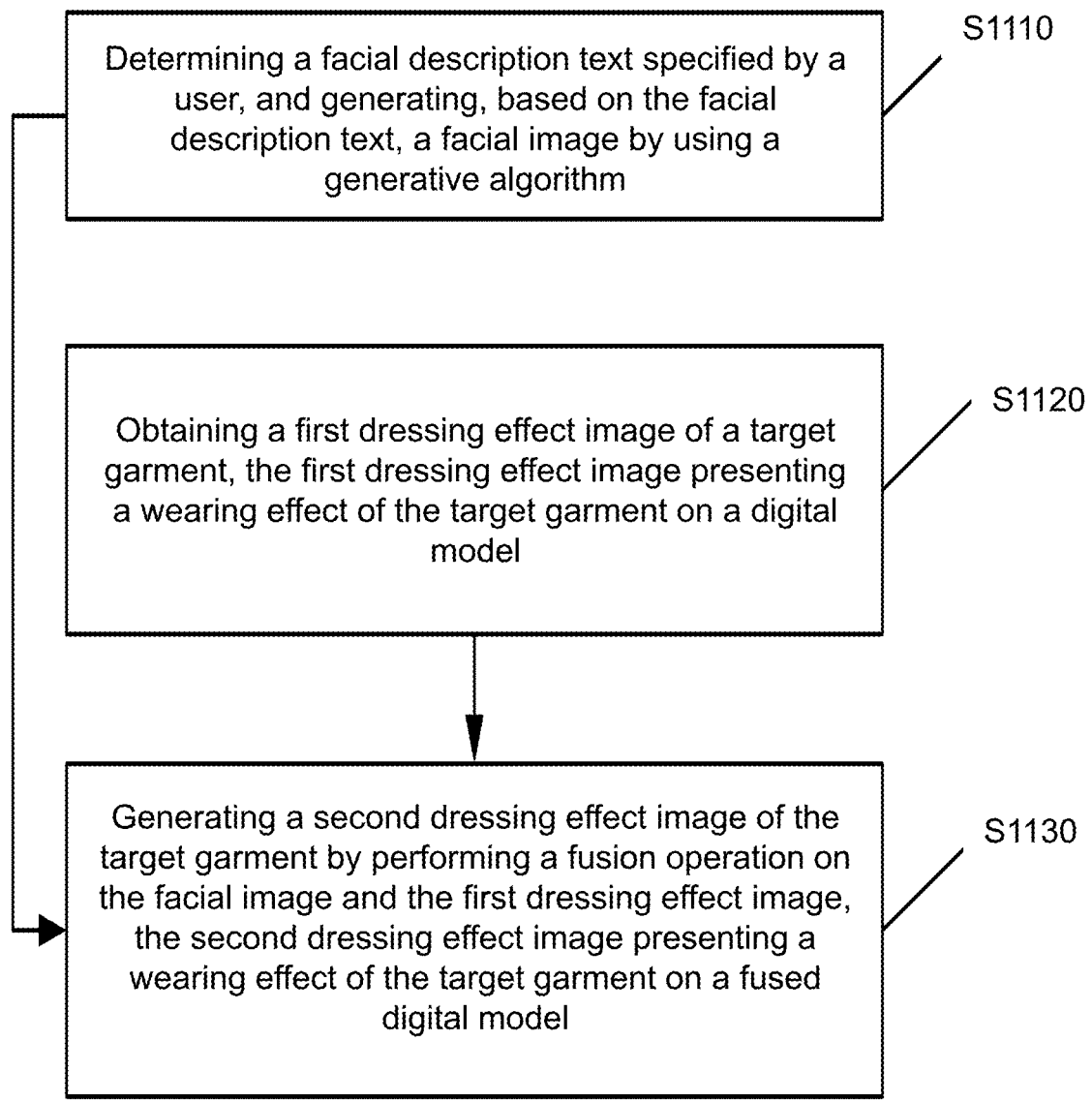
FIG. 11 is a flowchart of an exemplary process for personalized image generation provided in Embodiment 6.

As shown in FIG. 11, the method for personalized image generation includes operations S1110-S1130.

In S1110, a facial description text specified by a user may be determined and a facial image may be generated based on the facial description text by using a generative algorithm.

In some embodiments, the user may specify the face description text in accordance with his or her own needs, so that the system for personalized image generation may use a generative algorithm to generate the facial image based on the face description text to satisfy the user's needs. The facial image generated by this approach is more realistic (i.e., less CG feel), which helps to ensure that a second dressing effect image obtained by a fusion process is more realistic. The facial image generated in this way is the image to be fused.

The client may provide the user with a corresponding operation interface, such as displaying the operation interface after the user logs into an account through the client. The client may be a native application (i.e., Application, APP) installed on an electronic device, or the client may be in the form of an applet, a quick app, or other similar forms. Of course, when a web technology such as HTML5 is used, the above operation interface may be accessed and displayed via a browser, wherein the browser may be a standalone browser application or a browser module embedded in some applications.

Figure 14A:
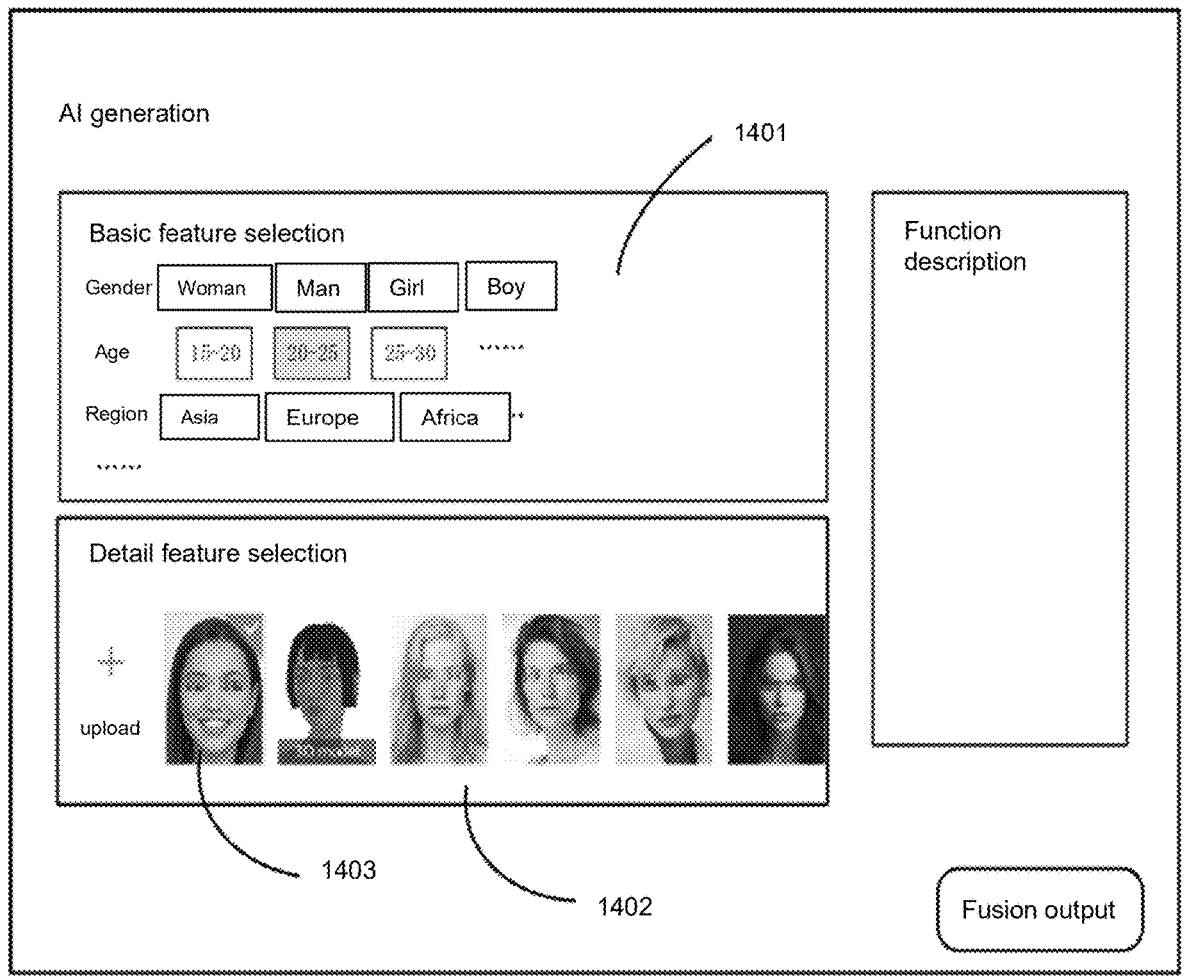
FIG. 14a is a schematic diagram of a selection interface for facial description options.
Figure 15A:
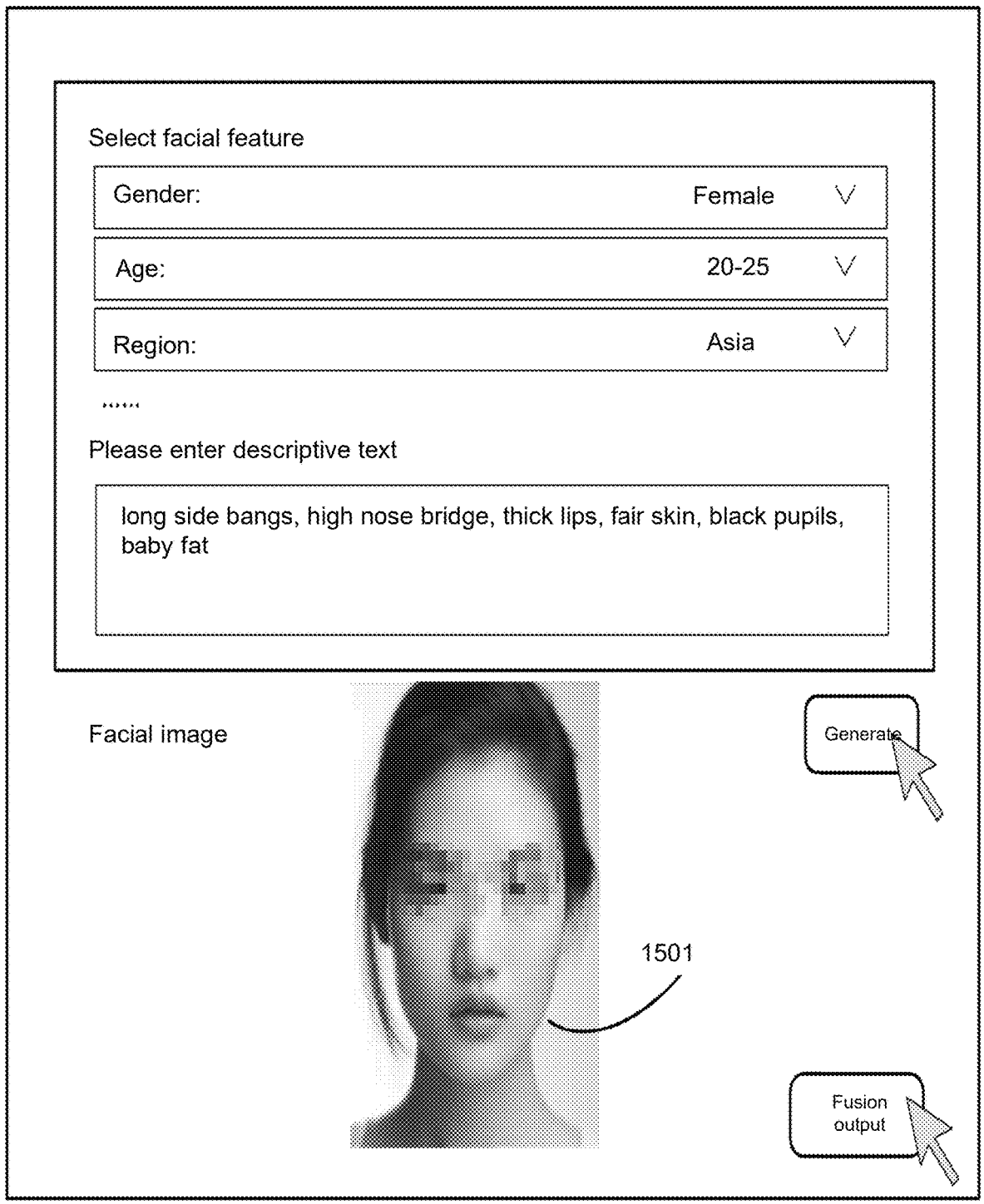
FIG. 15a is a schematic diagram of an input interface for facial description text.

In some embodiments, the user may specify the above face description text in multiple ways. For example, the operation interface may display a plurality of face description options, wherein each face description option has a corresponding face description text, and the user may select at least one of the face description options according to his or her own needs. Accordingly, the client may determine the face description text corresponding to the face description option selected by the user (the text determined in this manner is referred to as a first face description text). When the user selects a plurality of options at the same time, the client may determine the face description text corresponding to each of the selected options respectively. As shown in FIG. 14*a* and FIG. 15*a*, the interface displays "gender," "age," "region," etc., and the user may select a corresponding value for each option according to needs. Suppose that the user selects a gender of "Female," an age of "20-25," and a region of "Asian," the system may determine the selected values "Female," "20-25," and "Asian," as the first face description text.

In some embodiments, the operation interface may display a text input box in which the user may enter a face description text that meets his or her needs. Accordingly, the client may receive the face description text entered by the user (the text received in this manner is referred to as a second face description text). As shown in FIG. 15*a*, the interface displays a text "Please enter a description" along with a corresponding text input box. Suppose the user enters a text "side bangs, high nose bridge, thick lips, fair skin, dark irises, baby fat" in the input box. The system may then determine text as the second facial description text.

After obtaining the above face description text (i.e., the first face description text and/or the second face description text), the system may invoke a generative algorithm to generate a facial image based on the face description text. For example, the system directly uses the face description text as a prompt or generates a face prompt based on a description keyword in the face description text and a preset prompt template. The system may input the face prompt into the generative algorithm for inferential computation to generate a corresponding facial image. The generative algorithm may be deployed locally within the system, such as running on an electronic device where the client is located, or operating on a server where the service is hosted, etc. Alternatively, the generative algorithm may be set up on other platforms and accessed by the system through an open interface. For example, the generative algorithm may include a GAN, a diffusion model, etc., and embodiments of the present disclosure do not limit this.

In some embodiments, the system may obtain the facial image through a parametric description of at least one of a basic feature, a five-sense-organ feature, or a hair feature. The parametric description may be set according to a specific facial image or based on experience-driven settings to meet customization needs for facial images, thereby satisfying highly personalized customizations for facial images, and enabling the application of the system in more diverse scenarios. The parametric description may be achieved through generative algorithms such as GANs, diffusion models, etc., to generate facial images that meet feature requirements, thereby effectively achieving unique and aesthetically pleasing visual effects for faces in the images.

The system may describe each feature attribute of the facial image through a descriptive word to realize the parametric description, a token processing mechanism may be pre-constructed to process descriptive confusions of the feature attributes caused by a coupling relationship between the feature attributes regarding the descriptive words. The token processing mechanism may associate a facial feature with a general description of the feature, thus avoiding the confusion of the feature attributes caused by the coupling relationship between the feature attributes. The token mechanism establishes a differentiation between a neighboring descriptive word of a feature attribute and a non-neighboring descriptive word of the feature attribute, giving a higher weight to the neighboring descriptive word and a lower weight to the non-neighboring descriptive word, analogous to intra-cluster and inter-cluster spacing issues in clustering problems. For example, for "red eyebrows" and "light-colored lips," the token processing mechanism associates "red" with "eyebrows" and "light-colored" with "lips," thus avoiding confusion issues caused by coupling between the feature descriptions like "red lips" or "light-colored eyebrows."

In some embodiments, the system may pre-construct a model feature description mechanism with general rationality; establish a neighboring descriptive word and a non-neighboring descriptive word for each feature attribute; and reduce a probability of the descriptive confusion by enhancing, through the token processing mechanism, a differentiation between the neighboring descriptive word and the non-neighboring descriptive word of each feature attribute. The neighbor descriptive word and non-neighbor descriptive word for each feature attribute may be established based on the model feature description mechanism and a style requirement of the fused digital model. In addition, by enhancing the differentiation between the neighboring descriptive word and the non-neighboring descriptive word, the weight of the neighboring descriptive word is increased, the weight of the non-neighboring descriptive word is decreased, the description of the non-neighboring descriptive word on each feature attribute is reduced, and the probability of the descriptive confusion is reduced. Moreover, the model feature description mechanism may represent the description of facial features under general aesthetics. For example, the commonly recognized lip color is red rather than black, and thus red lips are included in the facial feature description mechanism. In other words, the facial feature description mechanism represents the usual recognition and aesthetic of facial features by a majority of people. Subsequently, it is necessary to integrate the facial feature description mechanism with the style requirement of the face of the fused digital model (hereinafter referred to as a fused model face) to establish the neighboring descriptive word and the non-neighboring descriptive word for each feature attribute. Given that the facial feature description mechanism only represents general cognition, there are models with special styles whose advanced looks are attributed to their facial uniqueness. Therefore, this embodiment considers such models with special facial styles. If the style of the fused model face is unique, a proportion of the model style increases significantly, while a proportion of the facial feature description mechanism is appropriately reduced, and some descriptions may even be modified. Finally, through the token processing mechanism, the differentiation between the neighboring descriptive word and the non-neighboring descriptive word is enhanced, thereby increasing the weight to the neighboring descriptive word and decreasing the weight to the non-neighboring descriptive word, thus reducing the impact of the non-neighboring descriptive words on feature attribute description and reducing the probability of descriptive confusion.

As shown in FIG. 15*a*, the user may click a "Generate" button at the bottom right to trigger the system to generate the corresponding facial image according to the above description text. The system generates the corresponding facial image according to the above description text, and a generated result is the facial image 1501.

In S1120, a first dressing effect image of a target garment may be obtained, the first dressing effect image presenting a wearing effect of the target garment on a digital model.

In addition to receiving or determining the foregoing facial image, the system needs to acquire the first dressing effect image of the target garment as an image to be fused. The target garment may include a piece of garment to be worn on a corresponding part of the digital model. For example, the target garment may include a hat, a scarf, a blouse, pants, a skirt, shoes, or the like, or any combination thereof. It should be noted that the target garment may include at least one piece of garment, such as only a skirt or only a blouse (i.e., wearing only one piece of garment on the digital model), or the target garment may include a hat, a blouse, and a skirt (i.e., wearing multiple pieces of garments at the same time on the digital model), or the like The first dressing effect image presents the wearing effect of the target garment on the digital model (after wearing the target garment on a corresponding part of the digital model's body).

In some embodiments, similar to the foregoing facial image, the first dressing effect image may be pre-generated by the user and uploaded to the system. The first dressing effect image may be pre-generated using image editing software such as PS, Style3D Studio, or the like.

In some other embodiments, the system may support a 3D modeling function. In this case, the system may perform 3D modeling on the target garment and the digital model to generate a 3D garment model and render the 3D garment model to obtain the first dressing effect image. In this way, the system for personalized image generation can use its own compatible 3D modeling function to generate the first dressing effect image, so as to realize seamless connection with subsequent fusion processing and realize one-stop personalized image generation, which helps to simplify user operations and enhance ease of use of the system. Of course, when the system does not support the 3D modeling function, it is also possible to receive the first dressing effect image generated by the 3D modeling function from another software that supports the 3D modeling function.

It should be noted that the first dressing effect image, divided according to image content, may include a garment region (i.e., a region in which the target garment is located), an exposed human body region (i.e., a human body region of the digital model that is not covered by the target garment, such as a human face, hair, neck, waist, limbs, etc.), and a background region (i.e., a region in the first dressing effect image other than the garment region and the exposed human body region). The exposed human body region may include only a face region (e.g., the digital model has only a human face and torso without any limbs). Of course, in some embodiments, the exposed human body region may also include a limb region (i.e., the digital model includes limbs), etc.

It should also be noted that the embodiments of the present disclosure do not restrict the sequence of operations S1110 and S1120, and these operations can be performed in any order according to actual needs.

In S1130, a second dressing effect image of the target garment may be generated by performing a fusion operation on the facial image and the first dressing effect image. The second dressing effect image presents a wearing effect of the target garment on the fused digital model. The fused digital model is a fused result of the face in the facial image and the body of the digital model in the first dressing effect image, i.e., the fused digital model may have the face in the facial image and the body of the digital model.

After determining the facial image and the first dressing effect image through the foregoing operations, the system may perform a fusion process on the facial image and the first dressing effect image to generate the second dressing effect image for presenting the wearing effect of the target garment on the fused digital model. In some embodiments, the facial image may be a third facial image of a target model face as described in connection with FIGS. 7 and 19. In some embodiments, the facial image may be a second facial image of a reference model face. A first facial image of a source model face may be obtained, and a third facial image of a target model face may be generated based on the second facial image and the first facial image by performing the process as described in connection with FIGS. 7 and 19. The second dressing effect image may be generated by fusing the third facial image and the first dressing effect image.

It may be understood that this solution allows for high-quality and rapid generation of garment images, enhancing the efficiency of image production, content distribution, and satisfying marketing needs. The solution maintains high fidelity to the modeled garment, is not difficult to operate, and significantly reduces time and labor costs. Moreover, the solution has a wide range of applications, and the user can specify the facial description text according to their needs to invoke the generative algorithm that creates face images meeting their needs. Compared to face images drawn by the user or captured from a 3D model, the face image generated by this method has a higher degree of realism (i.e., less CG feel), which helps ensure that the second dressing effect image obtained through the fusion process has strong authenticity. Moreover, by merging the facial image with the first dressing effect image, which shows the wearing effect of the target garment on the digital model, the second dressing effect image that presents the wearing effect of the target garment on the fused digital model can be produced. The second dressing effect image maintains features of the facial image and the digital model in the first dressing effect image, such that the appearance of the fused digital model in the second dressing effect image can present both the facial features in the facial image and the inherent body features of the digital model. The display effect of the second dressing effect image can also meet the user's requirements. Clearly, compared to directly cropping or face replacement technical solutions, the second dressing effect image obtained through the fusion process shows a more realistic and natural human display effect.

In some embodiments, in the fusion processing of the facial image and the first dressing effect image, on one hand, the facial feature vector may be extracted from the facial image; on the other hand, the first dressing effect image may be parsed to identify the garment region and the exposed human body region not covered by the target garment. A wearing effect feature vector may then be extracted from the first dressing effect image. The wearing effect feature vector may at least include a human body feature vector corresponding to the exposed body region. Furthermore, the facial feature vector and the wearing effect feature vector may be fused to obtain a fusion result (e.g., a third fused feature vector), and the fusion result may be decoded to obtain the second dressed effect image. It may be understood that the facial feature vector extracted from the facial image may represent the distinguishing feature of the face in the facial image. Meanwhile, the human body feature vector extracted from the wearing effect feature vector of the first dressed effect image may represent the distinguishing feature of a body part corresponding to the aforementioned exposed body region. By fusing these two types of feature vectors, this method ensures that the body part of the fused digital model in the second dressed effect image exhibits distinguishing features in both the face and the exposed body region, thereby ensuring feature consistency.

In some embodiments, the first dressing effect image may be parsed in a variety of ways to identify the garment region and exposed body region. For example, an image segmentation algorithm may be used to segment the first dressed effect image to identify the garment region and exposed body region. The image segmentation algorithm may be implemented using principles based on a threshold, an edge, a region, a cluster analysis, a wavelet transform, etc., or using artificial neural networks or genetic algorithms. As another example, if the first dressed effect image is obtained by rendering a 3D garment model, the image may inherit (or be associated with) corresponding 3D spatial information (e.g., depth information, curve information, lighting information, etc.) from the 3D garment model. Based on this, the system may identify the garment region and exposed body region based on the spatial information of the first dressing effect image.

In some embodiments, considering that the wearing effect feature vector includes the human body feature vector corresponding to the exposed human body region, the facial feature vector and the wearing effect feature vector may be fused by fusing the facial feature vector with the human body feature vector. If the wearing effect feature vector also includes a garment feature vector corresponding to the garment region, then a masking process may be performed on the garment region (and possibly the background region) in the first dressing effect image, so that the facial feature vector is only fused with the human body feature vector in the wearing effect feature vector but not with the garment feature vector. In this fusion process, the garment feature vector does not participate in fusion calculation, ensuring that a display effect of the target garment is completely consistent in both the first dressing effect image and the second dressing effect image.

Alternatively, the fusion process may be performed on the facial feature vector and the wearing effect feature vector, i.e., the facial feature vector may be fused with a combination of the human body feature vector and the garment feature vector. In this fusion approach, the garment feature vector participates in the fusion calculation, such that the target garment displays almost consistently in the first dressed effect image and the second dressed effect image, with slight variations in details such as angle and lighting. To ensure the target garment displays completely consistently in the first dressed effect image and the second dressed effect image, after fusing the facial feature vector with the combination of the human body feature vector and the garment feature vector, a corresponding vector in the fused result may be replaced by the garment feature vector, and the fused result after replacement may be decoded to obtain the second dressing effect image. Alternatively, after fusing the facial feature vector with the combination of the human body feature vector and the garment feature vector, an initial second dressing effect image may be decoded by decoding the fused result, and a corresponding portion of the image may be covered by the garment region to obtain the second dressing effect image. Through the above approach, the display effect of the target garment in the final generated second dressed effect image can be guaranteed to be completely consistent with the display effect of the target garment in the first dressing effect image.

In some embodiments, the human feature vector may be divided into a first facial feature vector (corresponding to the face in the first dressing effect image) and a first body feature vector (corresponding to the body in the first dressing effect image excluding the face). The facial feature vector is fused only with the first facial feature vector, such that the display effect of the face of the digital model in the first dressing effect image is altered without changing the display effect of the body.

As previously mentioned, the second dressing effect image may be obtained by decoding the fusion result. In some embodiments, during the decoding process, the fusion result corresponding to the human body region may be decoded to obtain a fused exposed human body region, and then the fused exposed human body region may be stitched with the garment region to obtain the second dressing effect image. This approach ensures that the display effect of the target garment in the obtained second dressing effect image is completely consistent with the display effect of the target garment in the first dressing effect image.

In the aforementioned embodiments, the fusion result includes a latent space representation, which has been described in the descriptions of Embodiments 4 and 5. It may be understood that latent space representation may be achieved through a dimensionality reduction technique (e.g., a principal component analysis, an autoencoder, etc.), which allows complex data structures to be mapped to a simpler and more compact space while retaining the distinguishing features of the data as much as possible. In a low-dimensional latent space, data is typically easier to process, parse, and understand, which facilitates data visualization and generation. Therefore, this approach facilitates tasks like dimensionality reduction, denoising, and feature extraction. Of course, if conditions such as fusion precision, computational resources, or the like are met, the fusion result may also be represented using feature space, parameter space, etc., which is not limited by the embodiments of the present disclosure.

Figure 12:
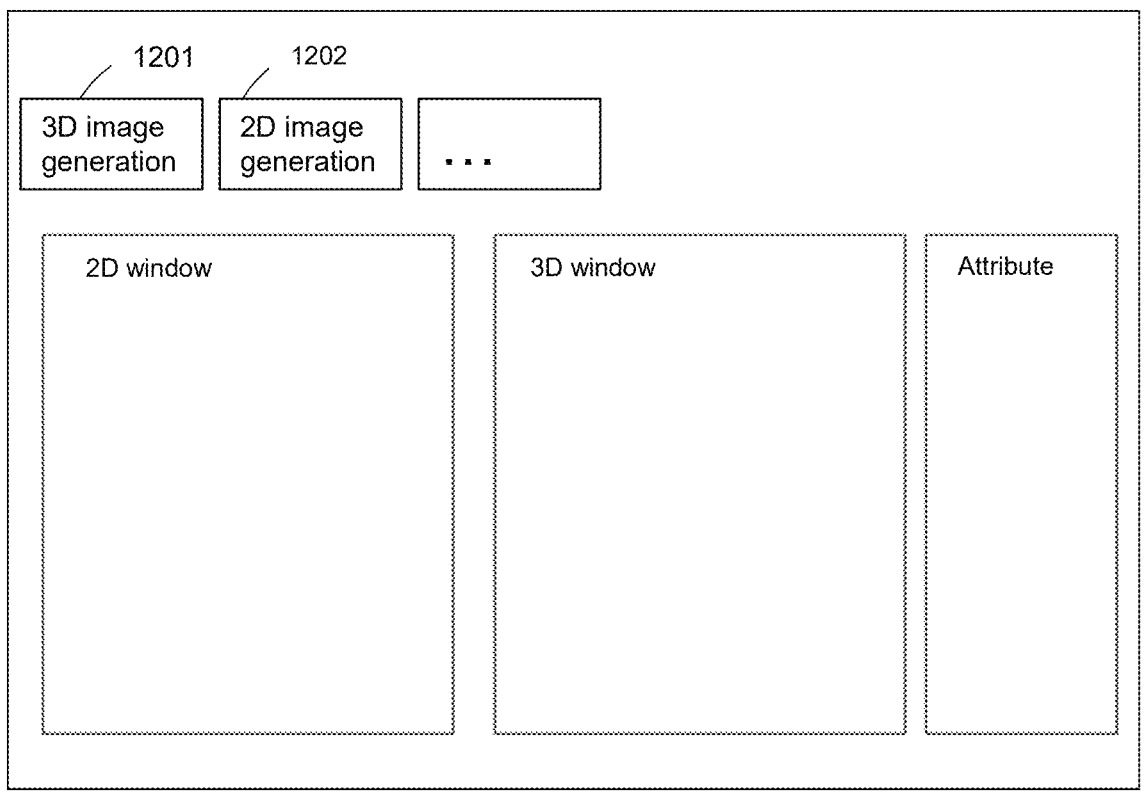
FIG. 12 is a schematic diagram of an operation interface for personalized image generation.
Figure 13:
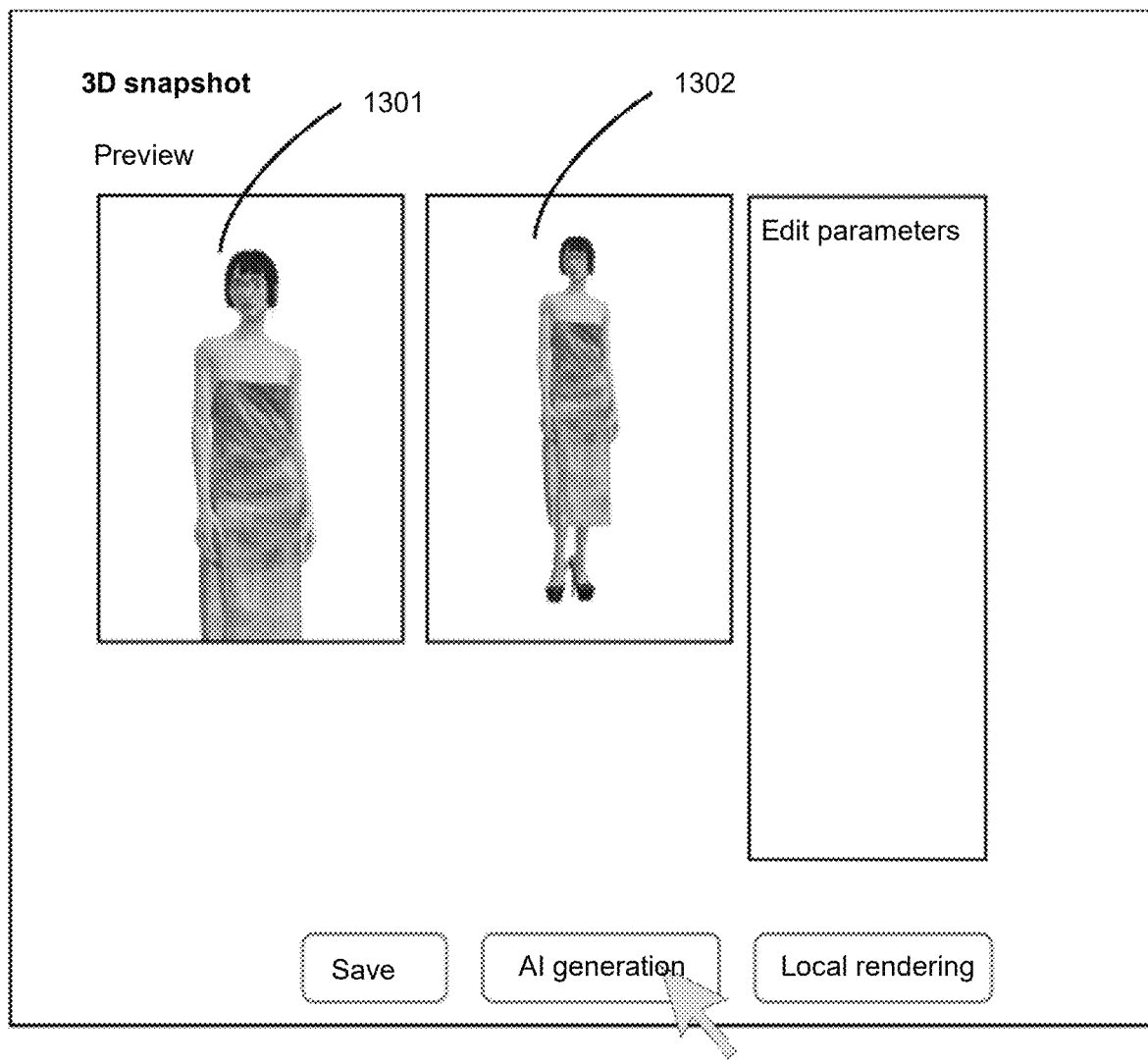
FIG. 13 is a schematic diagram of an operation interface for personalized image generation.

As shown in FIG. 12, the system for personalized image generation may support functions such as 3D image generation, 2D image generation, or the like, as shown in a "3D image generation" button 1202 and a "2D image generation" button 1202 in an operation interface in FIG. 12. The following embodiment is illustrated by taking a 3D image generation process as an example. After the user clicks on the "3D image generation" button 1201, the user is directed to a wearing effect editing interface shown in FIG. 13. In the wearing effect editing interface, the user may adjust image generation parameters such as a size, an angle, an orientation, a background, or the like of a 3D model (e.g., adjust these parameters in an "Edit Parameters" box on the right side of the interface), and trigger the system to render and output the dressing effect images from different viewpoints, as shown in FIG. 13, which outputs two dressing effect images 1301 and 1302. The user may click a "Save" button to save the above dressing effect images, or the user may click a "Local rendering" button to further render and edit the dressing effect images. In addition, the user may select any count of dressing effect images as objects for fusion processing (i.e., as the first dressing effect image described in some embodiments of the present disclosure). For example, the user may select the dressing effect image 1301.

After selecting the dressing effect image 1301, the user may click an "AI generation" button, and then jump to a facial image designating interface shown in FIG. 14a or a facial image generation interface shown in FIG. 15a.

In the facial image designating interface shown in FIG. 14a, the user may achieve personalized image generation through various operations. For example, the user may select a suitable facial feature in a basic feature selection box 1401 as needed, but not select any image in a detail feature selection box 1402. After the user clicks a "Fuse Image" button, the system may automatically generate a corresponding facial image in accordance with the above selected facial feature, and then perform fusion processing on the facial image and the dressing effect image 1301 (which is designated as the first dressing effect image) shown in FIG. 13 to obtain a corresponding second dressing effect image.

For example, the user may select any standard facial image provided by the system in the detail feature selection box 1402, or upload a pre-generated local facial image by the user and select the image, but not select the face features in the basic feature selection box 1401. At this time, after clicking the "Fuse Image" button, the system may take the facial image selected in the detail feature selection box 1402 as the fusion object, and fuse the facial image with the dressing effect image 1301 shown in FIG. 13 to obtain the corresponding second dressing effect image.

As another example, the user may select a suitable facial feature in the basic feature selection box 1401 and select any image in the detail feature selection box 1402, and then after clicking the "Fuse Image" button, the system may first generate a new facial image based on the selected facial feature and the selected image (the facial image is generated by overlaying the selected facial feature onto the selected image, and this overlay process may be regarded as a process of "feature fusion"), and then perform feature fusion on the facial image and the dressing effect image 1301 shown in FIG. 13 in order to obtain the corresponding second dressing effect image.

Figure 14B:
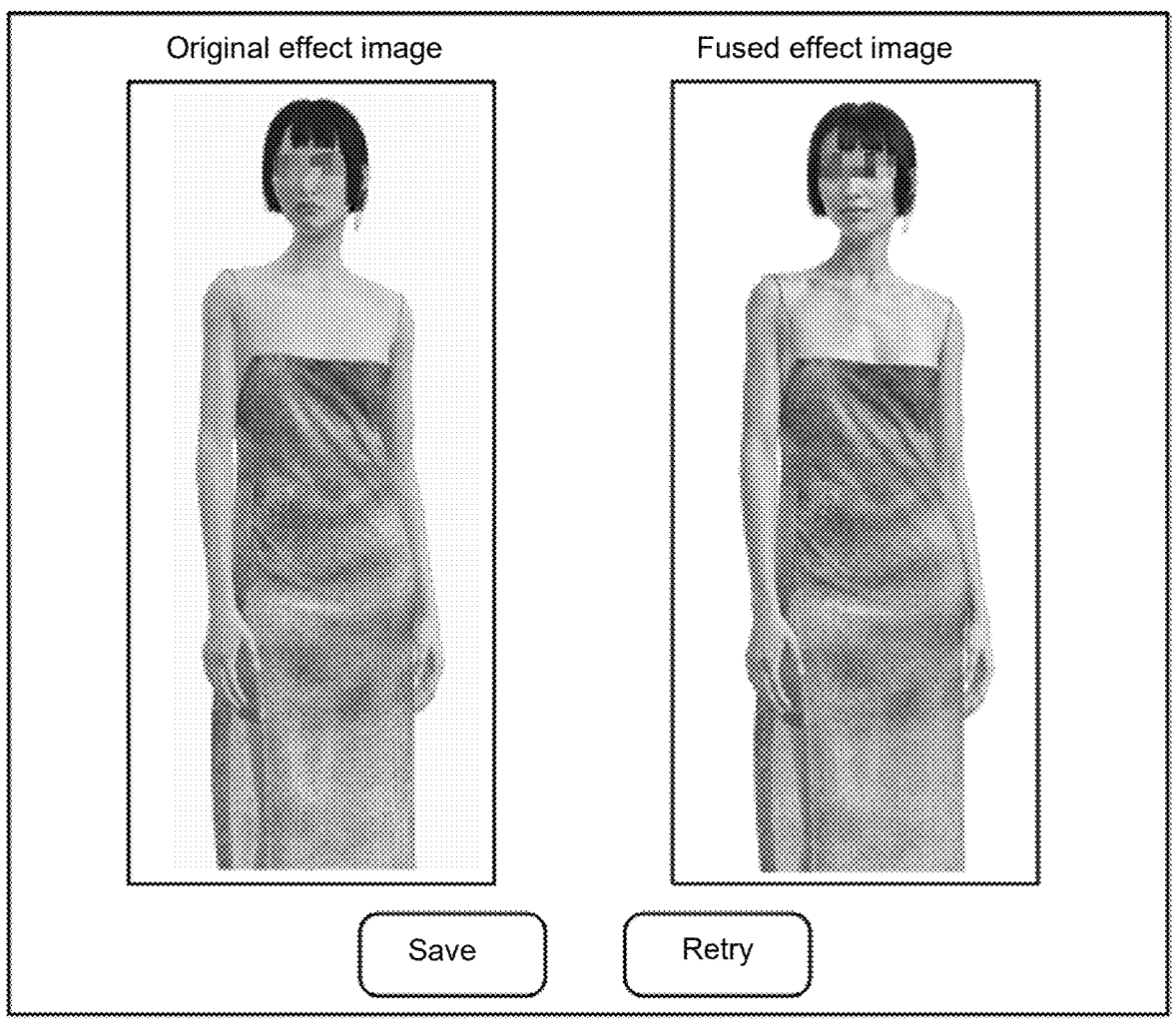
FIG. 14b is a schematic diagram of a facial image fusion processing result.

After generating the second dressing effect image, the user may be directed to a fusion effect display interface shown in FIG. 14*b*, in which an "original effect image" and a "fusion effect image" shown are the dressing effect image 1301 shown in FIG. 13 and the second dressing effect image obtained by the fusion processing, respectively. At this time, the user may click the "Save" button to save the fusion effect image. Of course, the original effect image and the fusion effect image may be saved simultaneously. Understandably, after the fusion effect image is saved, the process for personalized image generation of the provided solution is completed.

The basic features shown in FIG. 14*a* may be considered as the facial features corresponding to the first face description text described in the previous embodiment. In addition to this, the user may also flexibly edit the second face description text. As shown in FIG. 15*a*, in addition to selecting facial description options such as "gender," "age," and "region," the user may also enter a second facial description text in the text input box, such as "long side bangs, high nose bridge, thick lips, fair skin, black pupils, baby fat." At this point, when the user clicks the "Generate" button, the system may automatically generate a facial image that matches the features described by the first facial description text (i.e., "female," "20-25 years old," and "Asian," etc.) and the second facial description text (i.e., "long side bangs, high nose bridge, thick lips, fair skin, black pupils, baby fat"), as shown in the facial image 1501 in FIG. 15*a*. Of course, the user may also choose not to select the aforementioned basic features and directly input the second facial description text in the text input box, allowing the system to invoke a generative algorithm to produce the corresponding facial image based on the second facial description text, which will not be elaborated further. If the user is not satisfied with the image, the user may adjust the facial description options or the facial description text and regenerate a new facial image until the user is satisfied. If the user is satisfied with the facial image, the user may further click the "Fuse Image" button at the bottom right of the interface. At this point, the system may perform a fusion process on the first dressing effect image 1301 shown in FIG. 13 and the facial image 1501 shown in FIG. 15*a* to obtain the corresponding second dressing effect image.

Figure 15B:
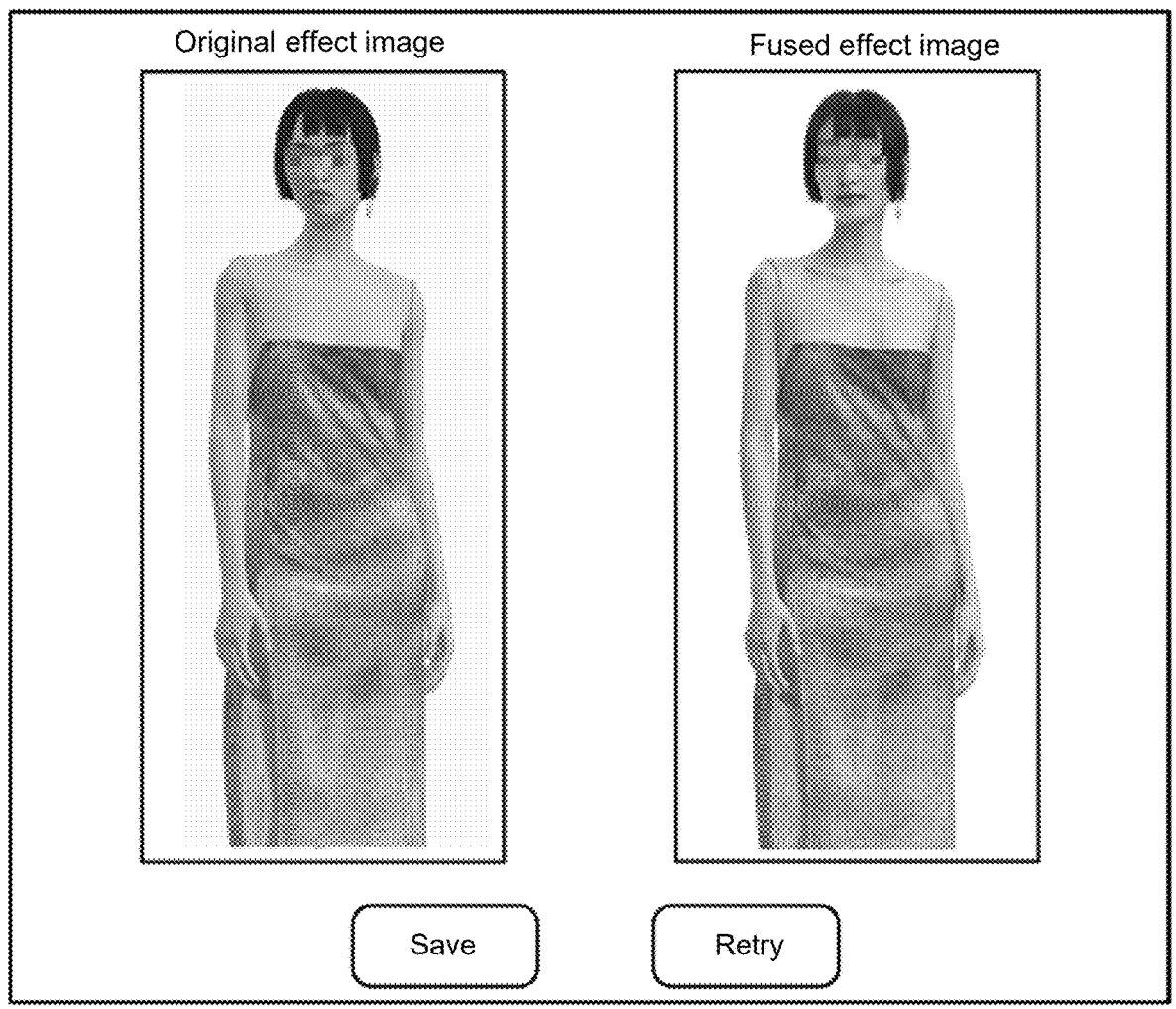
FIG. 15b is a schematic diagram of another face fusion processing result.

Similarly to the preceding embodiment, after generating the second dressing effect image, it is possible to jump to the fusion effect display interface shown in FIG. 15*b*, where the "original effect image" and the "fusion effect image" are the first dressing effect image 1301 shown in FIG. 13 and the second dressing effect image obtained by the fusion processing, respectively. At this point, the user may click the "Save" button to save the fusion effect image. Understandably, after the fusion effect image is saved, the process for personalized image generation described in the present solution is completed.

Of course, it is also possible to save both the above facial image and/or the first dressing effect image so that the user can trace the process of generating the second dressing effect image, which is not elaborated. In addition, if the user is not satisfied with the fusion result, they may upload the facial image again, or modify the face description text to generate a new facial image (of course, since the generative algorithm may generate different facial images based on a same prompt, the user may also click the "Generate" button to generate a new facial image without modifying the description text), and then click the "Fuse Image" button to generate a new fused image until the user is satisfied.

Additionally, it should be noted that FIG. 14*b* and FIG. 15*b* may display a corresponding facial image in addition to the original effect image and the fusion effect image, so that the user may clearly know a difference in the effect of the fusion processing, which makes it easy for the user to adjust the fusion effect.

As described above, the fusion effect display interface may display at least one of the facial image, the first dressing effect image, and the second dressing effect image, so as to allow the user to view the images and understand the detailed display effect, thereby facilitating the user to perform further operations.

In some embodiments, a display effect of the target garment in the first dressing effect image is consistent with a display effect of the target garment in the second dressing effect image. Depending on the above-described aggregation and decoding approaches, the two display effects may be identical, or there may be only slight differences in angle, light, etc., which will not be repeated. It should be noted that the solution for personalized image generation described in the present embodiment does not change the individual garment element (e.g., patterns and designs on the target garment) and their attributes (e.g., length, angle, position, color, etc., of the patterns) contained in the target garment in the first dressing effect image, but only modifies the display effect of the digital model in the first dressing effect image through the fusion process.

In some embodiments, after obtaining the second dressing effect image through the above operations, the system may also optimize and enhance the recognizability and expressiveness of the fused digital model. Specifically, one or more algorithms including a super-resolution algorithm, a detail optimization and enhancement algorithm, and a beautification algorithm may be used to optimize the fused digital model to enhance a refinement level of the fused digital model. Of course, other algorithms may be used for optimization according to practical needs.

For example, a model beautification module may include a face beautification module configured to beautify only the face (i.e., the aforementioned fused model face) of the model, whereby the system may use the face beautification module to optimize and enhance the recognizability and expressiveness of the face of the fused digital model. Specifically, the face beautification module may use one or more algorithms including the aforementioned super-scoring algorithm, the detail optimization and enhancement algorithm, and the beautification algorithm to optimize the fused model face, so as to enhance the refinement level of the fused model face, so that the model features such as a contour, five sensory organs, a skin color, or the like of the face are more refined and vivid, thereby ensuring that the face in the second dressing effect image has a better detail display effect and a better sense of realism.

Figure 20:
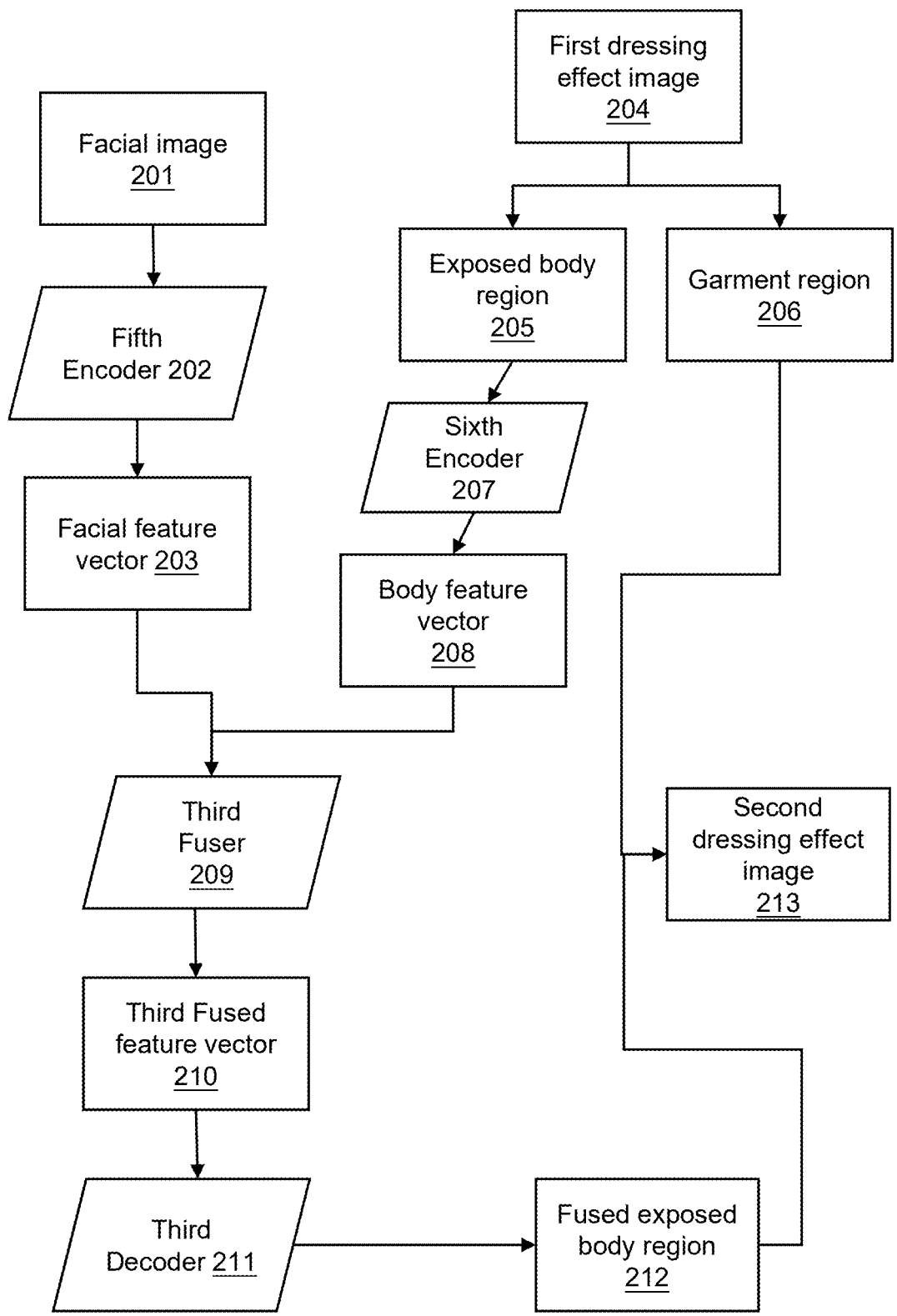
FIG. 20 is a schematic diagram illustrating an exemplary process for generating a second dressing effect image according to some embodiments of the present disclosure.

For illustration purposes, FIG. 20 illustrates an exemplary process for generating a second dressing effect image 213 according to some embodiments of the present disclosure. As shown in FIG. 20, a facial image 201 and a first dressing effect image 204 are obtained. In some embodiments, the facial image 201 is obtained by performing S1110. The facial image 201 is then input into a fifth encoder 202 to obtain a facial feature vector 203. In some embodiments, the fifth encoder 202 may be the same model as the third encoder 192. The first dressing effect image 204 is segmented into an exposed body region 205 and a garment region 206. The exposed body region 205 is input into a sixth encoder 207 to obtain a body feature vector 208. The facial feature vector 203 and the body feature vector 208 are input into a third fuser 209 to obtain a third fused feature vector 210. Further, the third fused feature vector 210 is input into a third decoder 211 to obtain a fused exposed body region 212 including the face in the facial image 201 and the exposed body region 205 in the first dressing effect image 204. The fused exposed body region is spliced with the garment region 206 to obtain the second dressing effect image 213. In some embodiments, the facial image 201 may be a third facial image of the target model face as described in connection with FIG. 7 or 19.

In some embodiments, the fifth encoder 202, the sixth encoder 207, the third fuser 209, and the third decoder 211 may be trained jointly by training an initial model using training samples. The initial model may include an initial fifth encoder, an initial six encoder, an initial third fuser, and an initial third decoder. Each training sample includes a first sample image, a second sample image, and a third sample image. The first sample image is a sample face image, the second sample image is a sample exposed body region image, and the third sample image is a sample fused exposed body region image. For example, the third sample image including the face and other exposed body region of a sample model is obtained, the first sample image and the second sample image are segmented from the third sample image. In the training process, the first sample image is input into the initial fifth encoder to obtain a sample facial feature vector corresponding to the first sample image, the second sample image is input into the initial sixth encoder to obtain a sample body feature vector corresponding to the second sample image, the sample facial feature vector and the sample body feature vector are input into the initial third fuser to obtain a third sample fused feature vector, the third sample fused feature vector is input into the initial third decoder, and the initial third decoder output a predicted fused exposed body region image. The value of a loss function is determined based on the predicted fused exposed body region image and the third sample image, and the initial model is iteratively updated based on the value of the loss function until a termination condition is satisfied. By jointly training the fifth encoder 202, the six encoder 207, the third fuser 209, and the third decoder 211, the training efficiency can be improved.

In some embodiments, the fifth encoder 202 and the sixth encoder 207 may be the same encoder (e.g., the first encoder). In some embodiments, the first encoder and the third decoder 211 may be trained jointly, and the third fuser 209 may be trained based on the first encoder and the third decoder 211.

Embodiment 7

Figure 16:
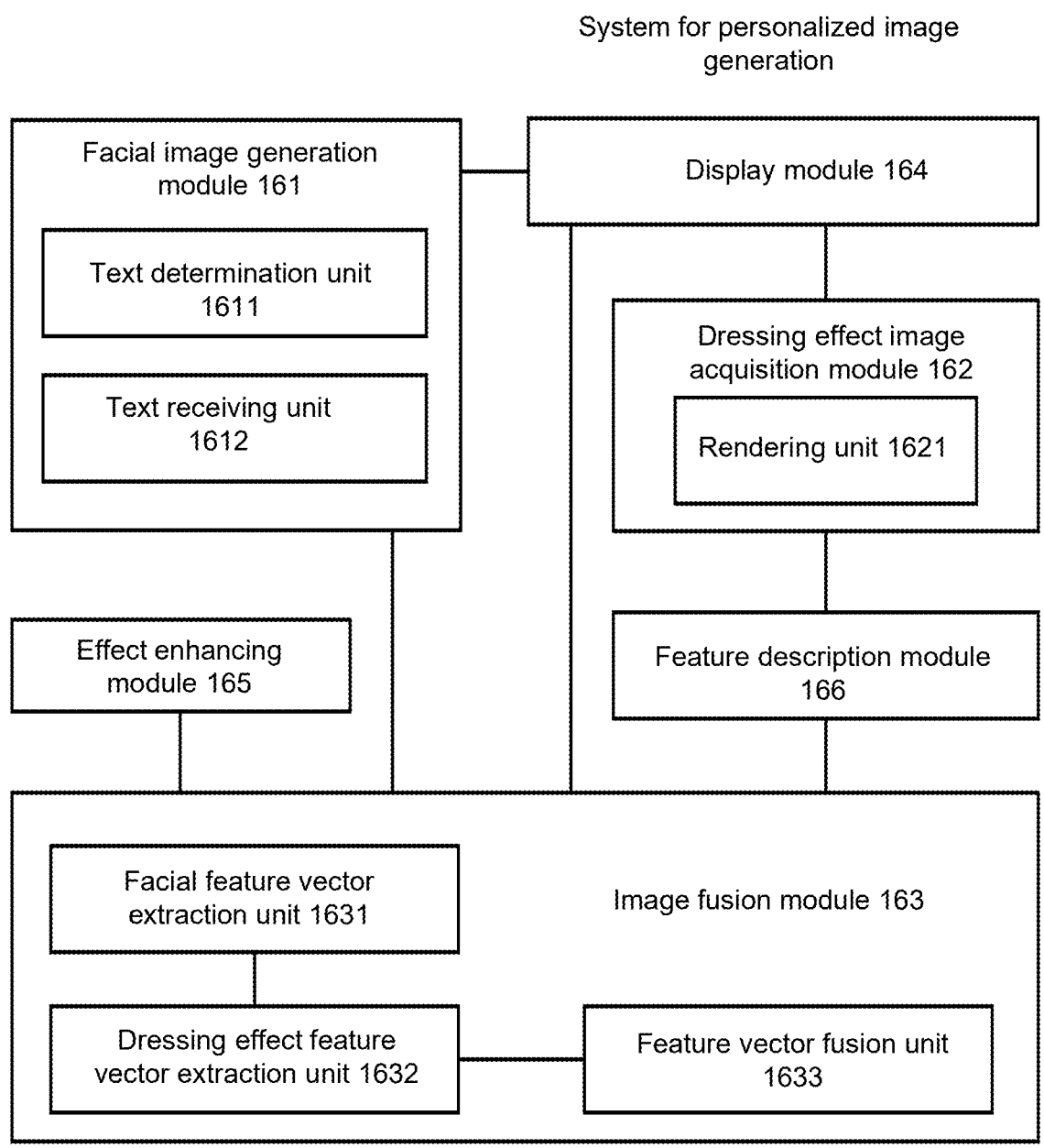
FIG. 16 is a block diagram of an exemplary system for personalized image generation provided in Embodiment 7.

The present embodiment proposes a system for personalized image generation, which systematizes the method for personalized image generation of Embodiment 6 to make the method more practical. The overall structure diagram of the system is shown in FIG. 16, and the system comprises a facial image generation module 161, a dressing effect image acquisition module 162, and an image fusion module 163.

The facial image generation module 161 is configured to determine a facial description text specified by a user and generate, based on the facial description text, a facial image by using a generative algorithm.

The dressing effect image acquisition module 162 is configured to obtain a first dressing effect image of a target garment, the first dressing effect image presenting a wearing effect of the target garment on a digital model; and The image fusion module 163 is configured to generate a second dressing effect image of the target garment by performing a fusion operation on the facial image and the first dressing effect image, the second dressing effect image presenting a wearing effect of the target garment on a fused digital model.

Optionally, the facial image generation module 161 may include a text determination unit 1611 and a text receiving unit 1612.

The text determination unit 1611 is configured to determine a first facial description text corresponding to a facial description option selected by the user.

The text receiving unit 1612 is configured to receive a second facial description text input by the user.

Optional, the dressing effect image acquisition module 162 may include a rendering unit 1621.

The rendering unit 1621 is configured to generate a three-dimensional (3D) dressing model by performing 3D modeling on the target garment and the digital model, and obtain the first dressing effect image by rendering the 3D dressing model.

Optionally, the image fusion module 163 may include a facial vector extraction unit 1631, a dressing effect vector extraction unit 1632, and a feature vector fusion unit 1633.

The facial vector extraction unit 1631 is configured to extract a facial feature vector from the facial image.

The dressing effect vector extraction unit 1632 is configured to obtain a dressing effect feature vector by parsing the first dressing effect image to identify a garment region and an exposed human body region that is not covered by the target garment and extracting the dressing effect feature vector from the first dressing effect image, the dressing effect feature vector at least including a human body feature vector corresponding to the exposed human body region.

The feature vector fusion unit 1633 is configured to obtain a fusion result by performing feature fusion on the facial feature vector and the dressing effect feature vector, and obtain the second dressing effect image by decoding the fusion result.

Optionally, the dressing effect vector extraction unit 1632 may be further configured to:
identify the garment region and the exposed human body region by segmenting the first dressing effect image using an image segmentation algorithm; or,
identify the garment region and the exposed human body region based on stereoscopic space-related information of the first dressing effect image.

Optionally, the feature vector fusion unit 1633 may be further configured to:
perform the feature fusion on the facial feature vector and the human body feature vector.

Optionally, the feature vector fusion unit 1633 may be further configured to:

obtain a fused exposed human body region by decoding the fusion result corresponding to the exposed human body region, and obtain the second dressing effect image by splicing the fused exposed human body region and the garment region.

Optional, the fusion result may include a latent space representation.

Optional, the system for personalized image generation may further comprise a display module 164 configured to display at least one of the facial image, the first dressing effect image, and the second dressing effect image.

Optionally, a display effect of the target garment in the first dressing effect image is consistent with a display effect of the target garment in the second dressing effect image.

Optional, the system for personalized image generation may further comprise an effect enhancement module 165 configured to optimize and enhance recognizability and expressiveness of the fused digital model after the second dressing effect image is obtained.

Optional, a refinement level of the fused digital model is enhanced by optimizing the fused digital model using at least one of a super-resolution algorithm, a detail optimization and enhancement algorithm, and a beautification algorithm.

Optionally, the facial image generation module 161 may be further configured to:

obtain the facial image by performing, based on the facial description text, a parametric description on at least one of a basic feature, a five-sense-organ feature, or a hair feature.

Optionally, the parametric description may be performed by describing each feature attribute of the facial image through descriptive words, wherein a token processing mechanism may be pre-constructed to process descriptive confusions of the feature attributes caused by a coupling relationship between the feature attributes regarding the descriptive words.

Optionally, the system for personalized image generation may further comprise a feature description module 166 configured to:

pre-construct a model feature description mechanism with general rationality;

establish a neighboring descriptive word and a non-neighboring descriptive word for each feature attribute; and reduce a probability of the descriptive confusions by enhancing, through the token processing mechanism, a differentiation between the neighboring descriptive word and the non-neighboring descriptive word of each feature attribute.

Optional, the feature description module may be further configured to: establish the neighboring descriptive word and the non-neighboring descriptive word for each feature attribute based on the model feature description mechanism and a style requirement of the fused digital model.

Optional, the method is applied to 3D model processing software configured to output images corresponding to 3D models.

Optional, the method is applied to 3D dressing model processing software configured to output dressing effect images based on 3D garment models and digital models.

Figure 17:
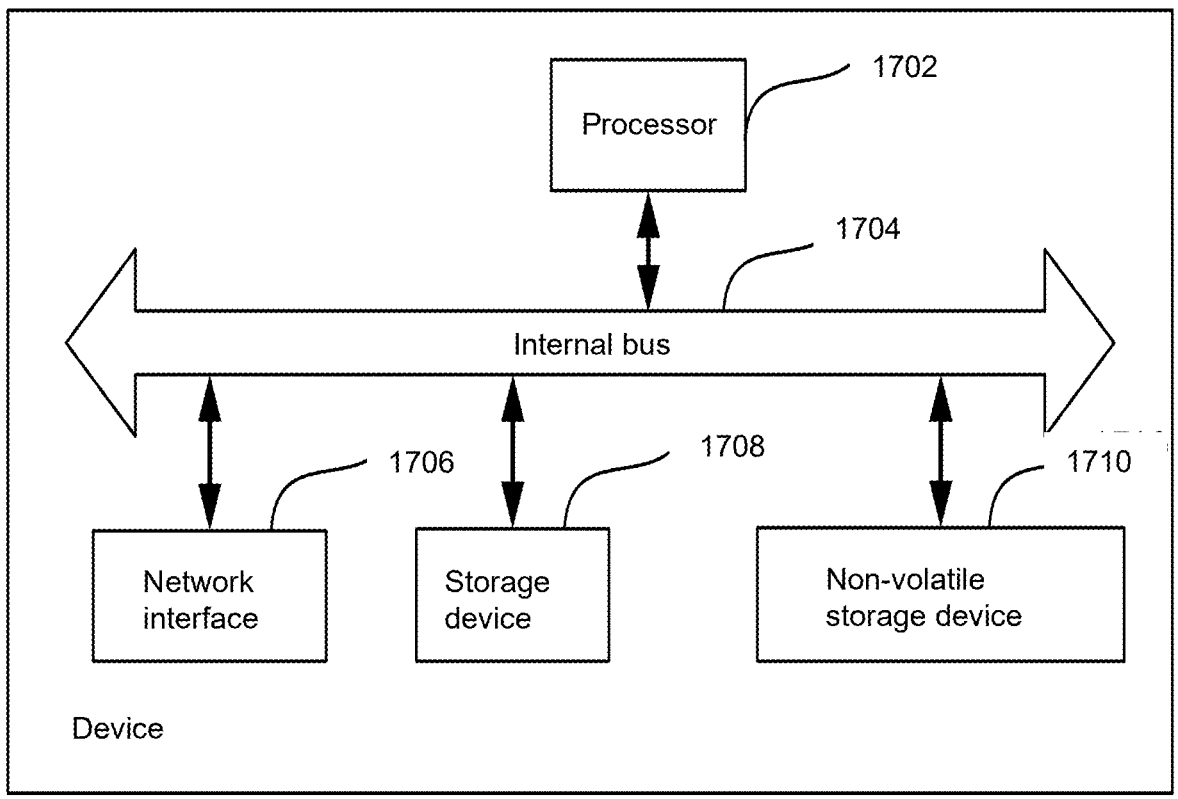
FIG. 17 is a schematic diagram of an exemplary device provided in some embodiments of the present disclosure.

FIG. 17 is a schematic diagram of an exemplary device provided in some embodiments of the present disclosure. Referring to FIG. 17, at a hardware level, the device includes a processor 1702, an internal bus 1704, a network interface 1706, storage device 1708, and a non-volatile storage device 1710. Of course, the device may include hardware required for other functions. One or more embodiments of the present disclosure may be implemented in a software-based manner. For example, the processor 1702 reads a corresponding computer program from the non-volatile storage device 1710 into the storage device 1708 and then runs the computer program. Of course, in addition to the software implementation, one or more embodiments of the present disclosure do not exclude other implementations, such as a logic device or a combination of hardware and software, or the like. In other words, the executing entities of the process described below are not limited to individual logic units and may also be hardware or logic devices.

Figure 21:
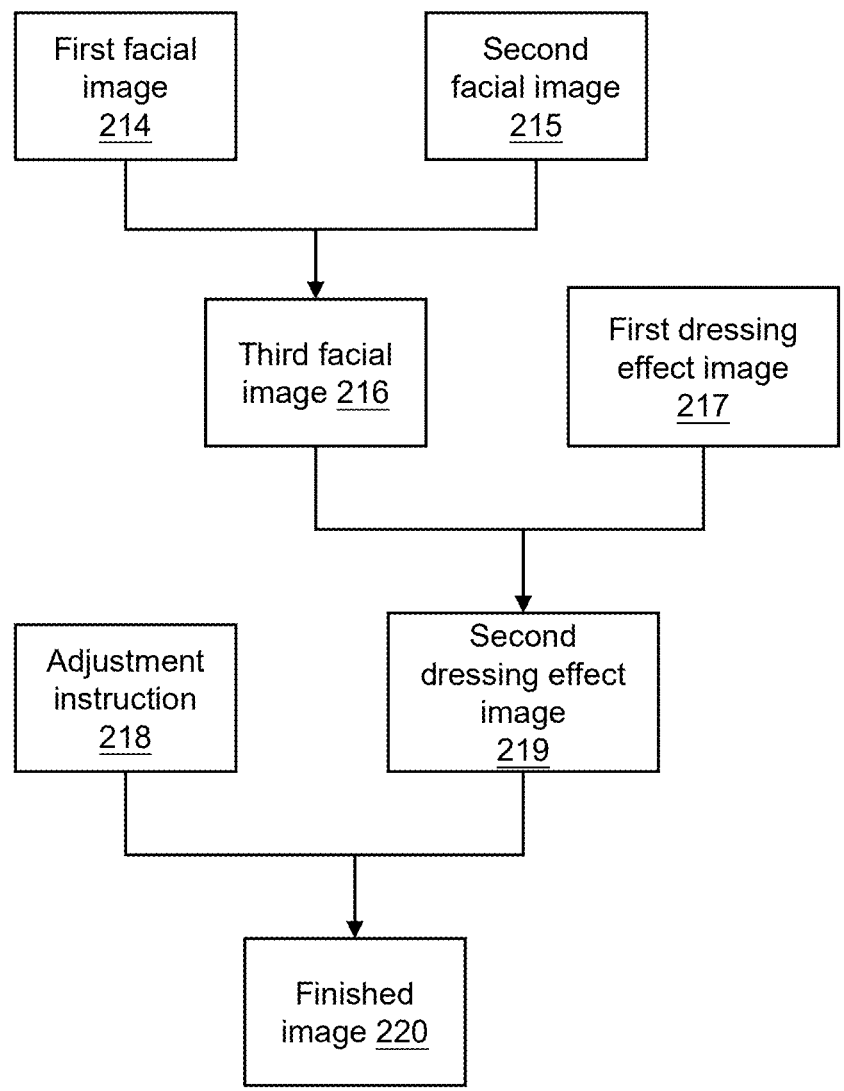
FIG. 21 is a schematic diagram of an exemplary process for generating a finished image according to some embodiments of the present disclosure.

FIG. 21 is a schematic diagram of an exemplary process for generating a finished image 220 provided in some embodiments of the present disclosure.

As shown in FIG. 21, a first facial image 214 including a source model face and a second facial image 215 including a reference model face are obtained, and a third facial image 216 of a target model face is generated based on the first facial image 214 and the second facial image 215. The generation of the third facial image 216 may be performed in a similar manner to that of the third facial image 198 as described in connection with FIG. 19. Then, the third facial image 216 is fused with a first dressing effect image 217 to generate a second dressing effect image 219. The first dressing effect image 217 presents a wearing effect of a target garment on a digital model, the second dressing effect image 219 presents a wearing effect of the target garment on a fused digital model, wherein the fused digital model has the target source face and the body of the digital model. The generation of the second dressing effect image 219 may be performed in a similar manner to that of the second dressing effect image 213 as described in connection with FIG. 20. Further, an adjustment instruction 218 is obtained, and a finished image 220 is generated by modifying the second dressing effect image 219 based on the adjustment instruction 218. The generation of the finished image 220 may be performed in a similar manner to that of the finished image 1800 as described in connection with FIG. 18.

It should be noted that the terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

In addition, the terms "first" and "second," etc., if present, are used for descriptive purposes only and are not to be understood as indicating or implying relative importance or implicitly specifying the number of technical features indicated. For example, the first encoder, the second encoder, etc., may refer to the same encoder or different encoders; the first decoder, the second decoder, etc., may refer to the same decoder or different decoders; the first fuser, the second fuser, etc., may refer to the same fuser or different fusers. In the description of the present disclosure, where the term "plurality" occurs, "plurality" means at least two, e.g., two, three, etc., unless otherwise expressly and specifically limited. The feature defined with "first" and "second" may expressly or implicitly include at least one such feature.

Based on the same concept of the methods described above, the present disclosure also provides an electronic device comprising: a processor; and a storage device configured to store processor-executable instructions. The processor may be configured to implement operations of the method described in any of the above embodiments by executing the executable instructions.

Based on the same concept of the methods described above, the present disclosure also provides a computer-readable storage medium storing computer instructions, wherein when executing the computer instructions, a processor implements operations of the method described in any of the above embodiments.

Based on the same concept of the methods described above, the present disclosure also provides a computer program or instruction, wherein when executing the computer program or instruction, a processor implements operations of the method described in any of the above embodiments.

What is claimed is:

1. A method for personalized image generation, comprising:
    obtaining an image including a model element and a garment element;
    obtaining a scene element;
    modifying a scene of the image based on the scene element;
    receiving at least one adjustment instruction, so as to modify the image to obtain a finished image;
    displaying an element editing interface; the element editing interface including at least one of one or more element options or one or more attribute options; and
    receiving at least one of an element option or an attribute option selected by a user, and determining the at least one adjustment instruction.

2. The method of claim 1, wherein the modifying a scene of the image based on the scene element includes:
    encoding the image to obtain an encoded image;
    modifying the encoded image by adding the scene element to obtain a modified image; and
    decoding the modified image to obtain the finished image.

3. The method of claim 1, wherein the scene element includes one or more elements of the following: a color tone, a layout, matching of the scene.

4. The method of claim 1, further comprising:
    parsing the garment element and the model element in the image; and
    modifying the image by adjusting the garment element and/or the model element to obtain the finished image.

5. The method of claim 4, wherein the modifying the image by adjusting the garment element and/or the model element to obtain the finished image includes:
    encoding the image to obtain an encoded image;
    modifying the encoded image by adjusting the garment element and/or the model element to obtain a modified image; and
    decoding the modified image to obtain the finished image.

6. The method of claim 4, wherein the model element includes one or more elements of the following: a skin color, an expression, a posture, a facial contour, a hair style, a body shape, a makeup; and
    the garment element includes one or more elements of the following:
    an outline, a texture, a color, and a style of the garment.

7. The method of claim 1, wherein the obtaining an image including a model element and a garment element includes:
    generating a 3D model by performing 3D modeling on a garment and a model, and obtaining the image by rendering the 3D model; or
    obtaining the image input by the user.

8. The method of claim 1, wherein the generating a 3D model by performing 3D modeling on a garment and a model includes:
    when generating the 3D model, pre-setting a scene compatible with the garment and the model to generate the 3D model including the scene.

9. The method of claim 1, wherein further comprising:
    the element editing interface includes at least one editing region corresponding to the garment element, the model element and the scene element; and
    receiving a user input via the least one editing region, and determining the at least one adjustment instruction.

10. The method of claim 1, wherein the receiving at least one adjustment instruction, so as to modify the image to obtain a finished image includes:
    encoding the image to obtain an initial feature vector of the image;
    modifying a portion of feature values in the initial feature vector, based on the adjustment instruction, to form a target feature vector; and
    decoding the target feature vector to obtain the finished image.

11. A system, comprising:
    at least one storage device storing a set of instructions; and
    at least one processor configured to communicate with the at least one storage device, wherein when executing the set of instructions, the at least one processor is configured to direct the system to perform operations including:
    obtaining an image including a model element and a garment element;
    obtaining a scene element;
    modifying a scene of the image based on the scene element;
    receiving at least one adjustment instruction, so as to modify the image to obtain a finished image;
    displaying an element editing interface; the element editing interface includes at least one editing region corresponding to the garment element, the model element and the scene element;
    receiving a user input via the least one editing region, and determining the at least one adjustment instruction.

12. The system of claim 11, wherein the modifying a scene of the image based on the scene element includes:
    encoding the image to obtain an encoded image;
    modifying the encoded image by adding the scene element to obtain a modified image; and
    decoding the modified image to obtain the finished image.

13. The system of claim 11, wherein the scene element includes one or more elements of the following: a color tone, a layout, and matching of the scene.

14. The system of claim 11, wherein the model element includes one or more elements of the following: a skin color, an expression, a posture, a facial contour, a hair style, a body shape, a makeup; and
    the garment element includes one or more elements of the following:
    an outline, a texture, a color, and a style of the garment.

15. The system of claim 11, wherein the obtaining an image including a model element and a garment element includes:

generating a 3D model by performing 3D modeling on a garment and a model, and obtaining the image by rendering the 3D model; or obtaining the image input by a user.

16. The system of claim 15, wherein the generating a 3D model by performing 3D modeling on a garment and a model includes:

when generating the 3D model, pre-setting a scene compatible with the garment and the model to generate the 3D model including the scene.

17. The system of claim 11, wherein further comprising:

parsing the garment element and the model element in the image; and modifying the image by adjusting the garment element and/or the model element to obtain the finished image.

18. The system of claim 17, wherein the modifying the image by adjusting the garment element and/or the model element to obtain the finished image includes:

encoding the image to obtain an encoded image;

modifying the encoded image by adjusting the garment element and/or the model element to obtain a modified image; and decoding the modified image to obtain the finished image.

19. A non-transitory computer-readable storage medium storing computer instructions, wherein when reading the computer instructions in the storage medium, a computer implements the method comprising:

obtaining an image including a model element and a garment element;

obtaining a scene element;

modifying a scene of the image based on the scene element;

receiving at least one adjustment instruction, so as to modify the image to obtain a finished image;

displaying an element editing interface; the element editing interface including at least one of one or more element options or one or more attribute options; and receiving at least one of an element option or an attribute option selected by a user, and determining the at least one adjustment instruction.

* * * * *